US010187175B2

(12) United States Patent
Iwasaki et al.

(10) Patent No.: US 10,187,175 B2
(45) Date of Patent: Jan. 22, 2019

(54) OPTICAL MULTIPLEXER/DEMULTIPLEXER AND OPTICAL TRANSCEIVER

(71) Applicant: KOHOKU KOGYO CO., LTD., Nagahama-shi, Shiga (JP)

(72) Inventors: Katsuhiro Iwasaki, Nagahama (JP); Takashi Kato, Nagahama (JP); Hiroaki Ono, Nagahama (JP)

(73) Assignee: KOHOKU KOGYO CO., LTD., Nagahama-shi (JP)

( * ) Notice: Subject to any disclaimer, the term of this patent is extended or adjusted under 35 U.S.C. 154(b) by 0 days.

(21) Appl. No.: 15/815,711

(22) Filed: Nov. 17, 2017

(65) Prior Publication Data

US 2018/0145789 A1 May 24, 2018

(30) Foreign Application Priority Data

Nov. 18, 2016 (JP) .................................. 2016-224800
Nov. 18, 2016 (JP) .................................. 2016-224802

(51) Int. Cl.
*H04J 14/02* (2006.01)
*H04B 10/40* (2013.01)

(52) U.S. Cl.
CPC .......... *H04J 14/0278* (2013.01); *H04B 10/40* (2013.01)

(58) Field of Classification Search
CPC ............................ H04J 14/0278; H04B 10/40
(Continued)

(56) References Cited

U.S. PATENT DOCUMENTS 5,583,683 A * 12/1996 Scobey .................. G02B 5/288
359/587
6,636,654 B2 * 10/2003 McGuire, Jr. .......... G02B 6/356
385/129
(Continued)

FOREIGN PATENT DOCUMENTS

JP 2005092120 A 4/2005
JP 2008111863 A 5/2008
JP 2015011214 A 1/2015

OTHER PUBLICATIONS

Kamisugi et al., "40 Gbit/s Small-Form Low-Power Optical Transceiver", SEI Technical Review, Jul. 2013, vol. 183, pp. 60-64.
(Continued)

*Primary Examiner* — Juan A Torres
(74) *Attorney, Agent, or Firm* — Isshiki international Law Office; Joseph P. Farrar, Esq.

(57) ABSTRACT

An optical multiplexer/demultiplexer includes: first to n-th demultiplexed light input/output portions; a multiplexed light input/output portion; second to n-th interference film filters; and first to n−1-th mirrors. The first to n-th demultiplexed light input/output portions are disposed on a single plane and correspond to light having a single wavelength. The second to n-th interference film filters are disposed in front of the second to n-th demultiplexed light input/output portions. The first to n−1-th mirrors are disposed in front of the first demultiplexed light input/output portion and in front of the n−1-th interference film filters. Light from the first demultiplexed light input/output portion strikes the first to n−1-th mirrors and the second to n-th interference film filters and is input to the multiplexed light input/output portion. Light output from the multiplexed light input/output portion strikes the second to n-th interference film filters and first to n−1-th mirrors.

19 Claims, 29 Drawing Sheets

(58) Field of Classification Search
USPC .......................................................... 398/85
See application file for complete search history.

(56) References Cited

U.S. PATENT DOCUMENTS

| | | | | |
|---|---|---|---|---|
| 7,058,257 | B2* | 6/2006 | Pan | G02B 6/29367 |
| | | | | 385/24 |
| 7,215,853 | B2* | 5/2007 | Morita | H04J 14/0201 |
| | | | | 385/16 |
| 7,657,179 | B2* | 2/2010 | Mahgerefteh | G02B 6/29365 |
| | | | | 398/82 |
| 8,537,468 | B1* | 9/2013 | Wang | G02B 27/0025 |
| | | | | 359/619 |
| 9,590,759 | B1* | 3/2017 | Peng | H04J 14/02 |
| 9,746,412 | B2* | 8/2017 | Chen | G01N 15/1459 |
| 9,843,394 | B2* | 12/2017 | Xiao | H04B 10/40 |
| 2003/0099434 | A1 | 5/2003 | Liu et al. | |
| 2003/0206688 | A1* | 11/2003 | Hollars | G02B 6/29365 |
| | | | | 385/24 |
| 2018/0128983 | A1* | 5/2018 | Huang | G02B 6/29365 |

OTHER PUBLICATIONS

English translation of Kamisugi et al., "40 Gbit/s Small-Form Low-Power Optical Transceiver", SEI Technical Review, Jul. 2013, vol. 183, pp. 60-64.

\* cited by examiner

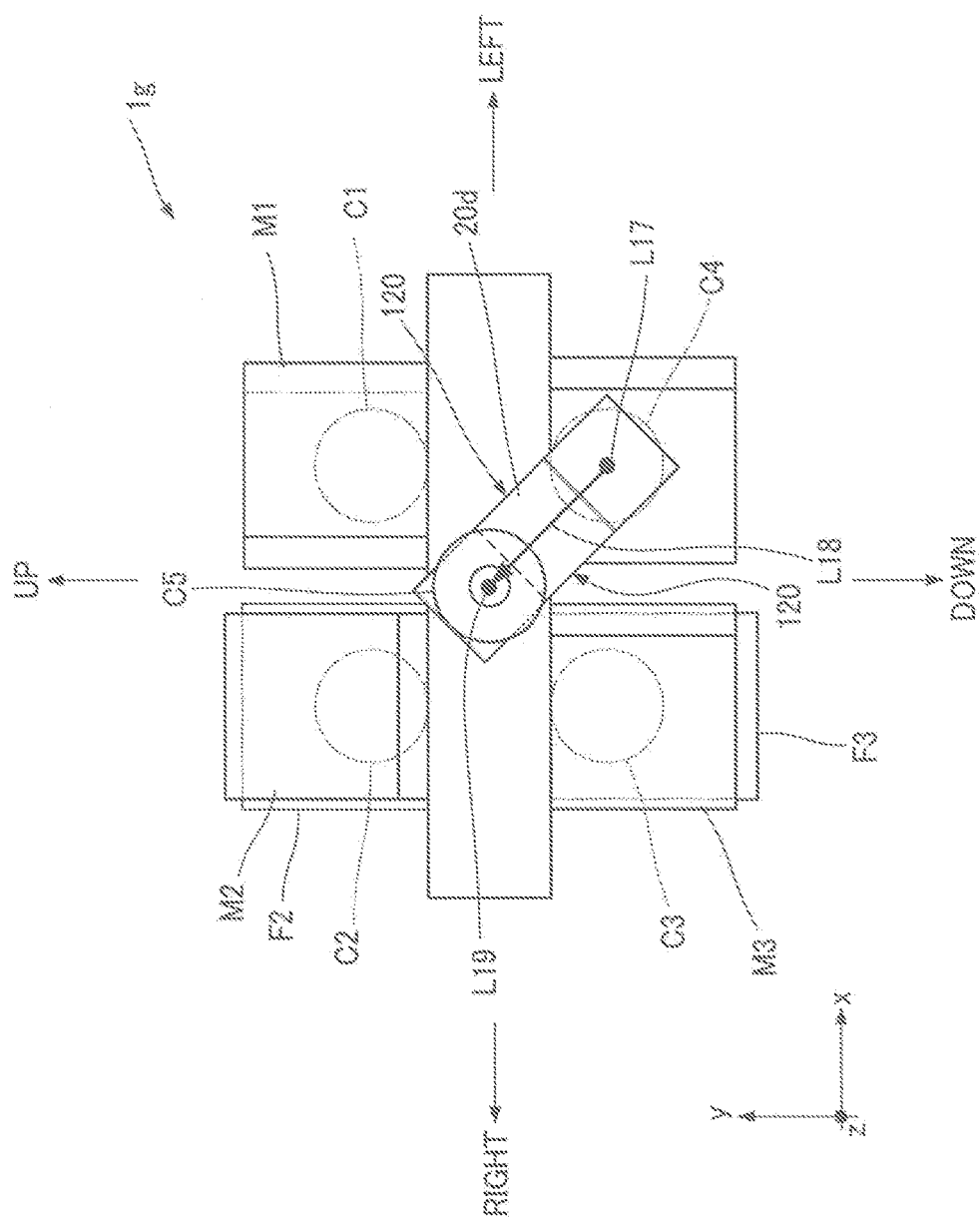

OPTICAL MULTIPLEXER/DEMULTIPLEXER AND OPTICAL TRANSCEIVER

CROSS-REFERENCE TO RELATED APPLICATIONS

This application is based on and claims priority under 35 U.S.C. § 119 to Japanese Patent Application Nos. 2016-224800 and 2016-224802, filed on Nov. 18, 2016 in the Japan Patent Office, the entire contents of which are incorporated herein by reference.

BACKGROUND

Technical Field

This disclosure relates to an optical multiplexer/demultiplexer and an optical transceiver. Specifically, the present disclosure relates to an optical multiplexer/demultiplexer using an interference film filter and a technique to miniaturize an optical transceiver including the optical multiplexer/demultiplexer.

Related Art

Optical communications in an optical wavelength division multiplex (WDM) transmission method permit high-speed, large-capacity data transmission by transmitting, through a single optical fiber, optical signals having a plurality of different wavelengths. This arrangement enhances transmission capacity of an existing optical fiber cable network without the need for laying new optical fiber cables.

At sites in an optical communications network, there are installed optical transmission devices which perform various functions such as conversion between the optical signals and electrical signals, joining, relaying and branching a plurality of optical signal transmission paths. An optical transceiver transmits and receives the optical signals which have been input from one optical transmission device and optical transmission path and will be output to another optical transmission device and optical transmission path. Such an optical transceiver is incorporated into the optical transmission device. A main optical element constituting the optical transceiver compatible with the WDM transmission method is an optical multiplexer/demultiplexer. The optical multiplexer/demultiplexer functions as an optical multiplexer that multiplexes the plurality of optical signals having different wavelengths, on a transmitting side of the optical transceiver. On the other hand, on a receiving side, the optical multiplexer/demultiplexer functions as an optical demultiplexer; the optical demultiplexer demultiplexes the multiplexed signal of the optical signals having the plurality of wavelengths which has propagated through a single optical transmission path (such as the optical fiber) into a plurality of lights having different wavelengths, and then delivers the signals to the plurality of optical transmission paths.

As a method for multiplexing and demultiplexing the lights by the optical multiplexer/demultiplexer, there are a variety of methods available, including a method using a diffraction grating, a method using an arrayed-waveguide grating (AWG), and similar methods. A method using an interference film filter, which includes an interference film constituted of a dielectric multilayer film, has a simple structure and is inexpensive compared with the other methods. For an optical transceiver which has large intervals between the respective wavelengths of the optical signals to be multiplexed and whose transmission channels are not so many, an optical multiplexer/demultiplexer using this interference film filter has been often used.

A recent spread of portable information terminals typified by smart phones or cloud computing (for example, SaaS, PaaS, HaaS, and a network storage) has rapidly increased communication traffic on the optical communications network serving as a backbone for a data communications network. Therefore, in addition to demands for higher speed and lower power consumption, miniaturization has also been sought for various devices configured in the optical communications network, especially the optical transmission devices for data centers. Hence, miniaturization has also been sought for the optical transceivers incorporated into the optical transmission devices.

Currently, as for an optical transceiver which is interposed in a large-capacity optical communications network of 40 Gbps or 100 Gbps, and which is compatible with the WDM transmission method, an optical transceiver of a standard referred to as a C form-factor pluggable (CFP, length 144.75×width 82×height 13.6 mm) is common. However, this CFP-compliant optical transceiver is larger than a compact optical transceiver compatible with a small capacity of 10 Gbps. Therefore, it is difficult to replace the previous small-capacity optical transceiver for optical transmission with the large-capacity, a CFP optical transceiver in the data center and a similar site.

Therefore, large-capacity, compact optical transceivers of new standards with which CFP can be substituted has been developed. Specifically, there can be provided compact optical transceivers of a new standard such as Quad Small Form-factor Pluggable Plus (QSFP+, length 72.4×width 18.35×height 8.5 mm) and CFP4 (length 92×width 21.5×height 9.5 mm), which ensure high-density loading which is four times that of CFP. Such new-standard optical transceivers have smaller length, width and height than the CFP optical transceiver. Especially, the width is significantly reduced compared with the length and the height, to around a quarter of the CFP standard, which is 82 mm.

The standards and configurations of the optical transceivers are described in Hideaki Kamisugi, Kuniyuki Ishii, Tetsu Murayama, Hiromi Tanaka, Hiromi Kurashima, Hiroto Ishibashi, and Eiji Tsumura "Low-Power Optical Transceiver for Data center Networks" (July, 2013, SEI TECHNICAL REVIEW, No. 183, pages 60 to 64).

SUMMARY

According to the present disclosure, an improved optical multiplexer/demultiplexer includes first to n-th demultiplexed light input/output portions, where n is defined as a natural number of 3 or more, a multiplexed light input/output portion, first to n−1-th mirrors, interference film filters, and an n-th interference film filter. The first to n-th demultiplexed light input/output portions are disposed to input/output n kinds of first to n-th monochromatic lights with respective different wavelengths along a first direction. The first to n-th demultiplexed light input/output portions are each disposed away from one another in a direction intersecting with the first direction. The multiplexed light input/output portion is configured to input/output a multiplexed light produced by multiplexing the n kinds of monochromatic lights along the first direction. The first to n−1-th mirrors are configured to reflect the respective first to n−1-th monochromatic lights. The first to n−1-th monochromatic lights enter insides of the first to n−1-th mirrors from the first to n−1-th demultiplexed light input/output portions. The interference film filters are disposed on respective optical paths between the second to n−1-th demultiplexed light input/output portions and the second to n−1-th mirrors. The interference film filters are each configured to selectively transmit the second to n−1-th monochromatic lights to reflect lights with other wavelengths. The n-th interference film filter is disposed on an optical path between the n-th demultiplexed light input/output portion and the multiplexed light input/output portion. The n-th interference film filter is configured to selectively transmit the n-th monochromatic light to reflect a light with another wavelength. The first mirror is disposed to reflect a light between the first demultiplexed light input/output portion and the second interference film filter. Defining k as a natural number from 2 to n−1, the k-th mirror is disposed such that the k-th mirror reflects alight between the k-th interference film filter and the k+1-th interference film filter. The k-th interference film filter is disposed such that the k-th interference film filter reflects a light other than the k-th monochromatic light between the k−1-th mirror and the k-th mirror. The n-th interference film filter is disposed such that the n-th interference film filter reflects a light other than the n-th monochromatic light between the n−1-th mirror and the multiplexed light input/output portion.

BRIEF DESCRIPTION OF THE DRAWINGS

FIG. 8A is a drawing illustrating an optical multiplexer/demultiplexer according to a second modification of the fourth embodiment of this disclosure.

DETAILED DESCRIPTION

Figure 1A:
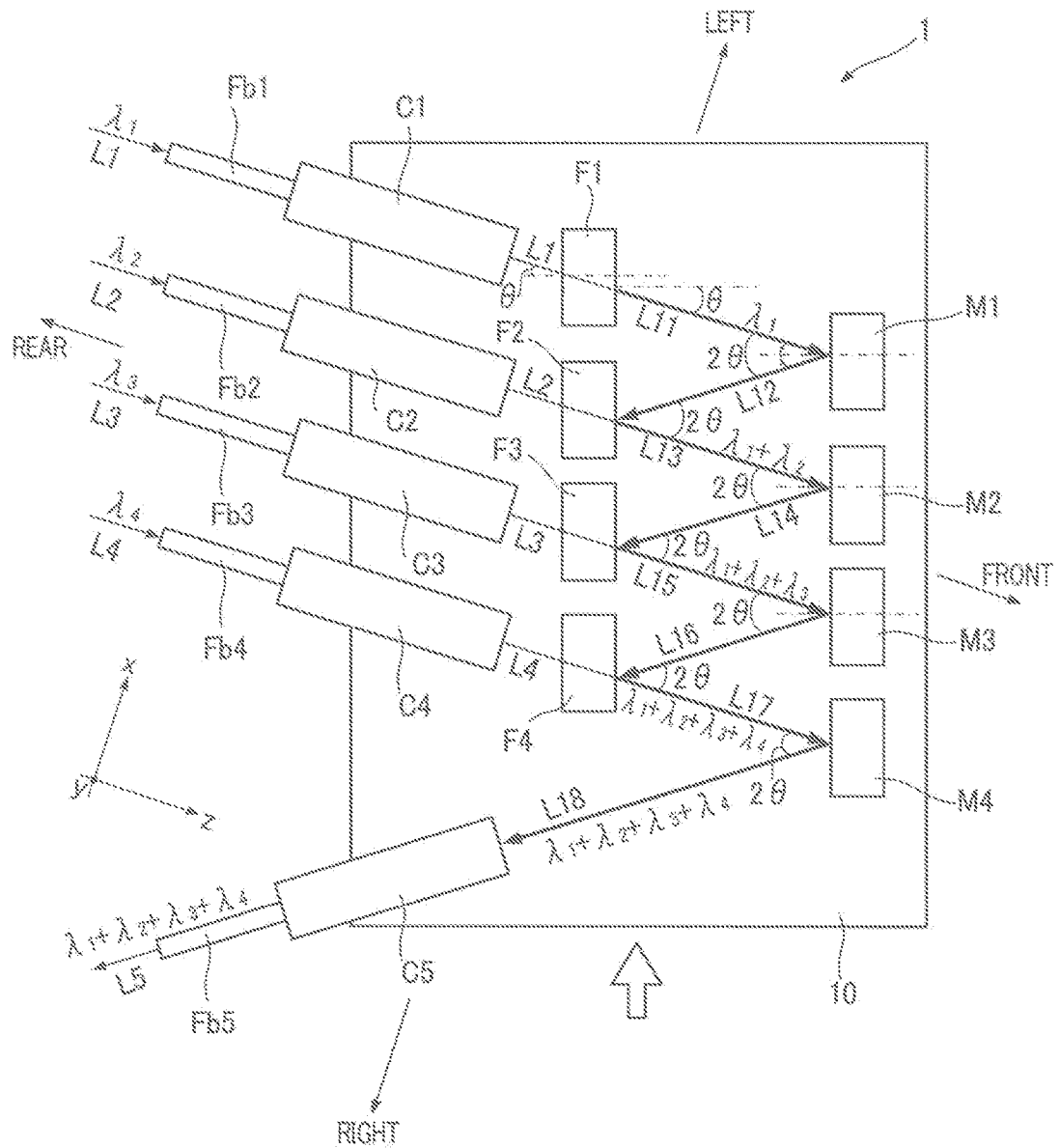
FIG. 1A is a drawing illustrating a configuration of a certain general optical multiplexer/demultiplexer using an interference film filter.

At least the following matters will become apparent from descriptions of the present specification.

With an optical multiplexer/demultiplexer disclosed in the present specification, miniaturizing is achieved and the optical multiplexer/demultiplexer can be incorporated into a compact optical transceiver. Other effects will be apparent in the following description.

The following describes embodiments disclosed in the present specification with reference to the attached drawings. Like reference numerals designate corresponding or identical elements in the drawings used for the following description, and therefore such elements will not be further elaborated. While a reference numeral is assigned to a part in a drawing, if unnecessary, the reference numeral is not assigned to the corresponding part in another drawing.

Figure 1B:
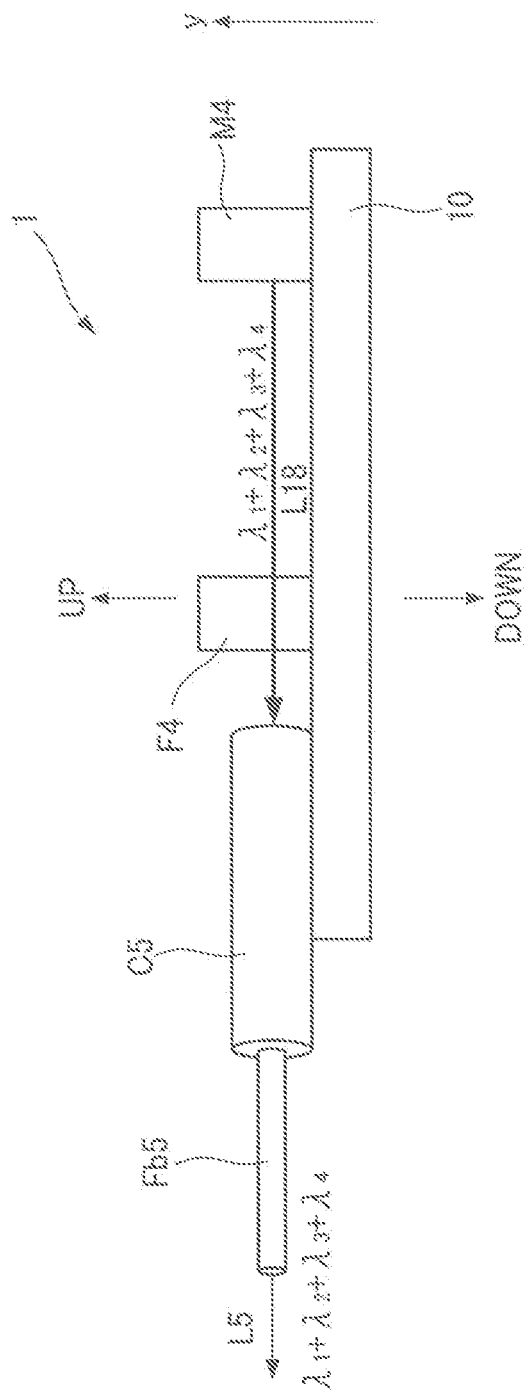
FIG. 1B is a drawing illustrating the configuration of the certain general optical multiplexer/demultiplexer using the interference film filter.

First, FIG. 1A and FIG. 1B illustrate a certain general optical multiplexer/demultiplexer 1 using an interference film filter. In the optical multiplexer/demultiplexer 1, all entrances and exits of optical signals from the outside (hereinafter also referred to as optical input/output portions) such as opening ends of optical fiber collimators are linearly disposed. The optical multiplexer/demultiplexer 1 illustrated in FIG. 1A and FIG. 1B uses opening ends of optical fiber collimators (C1 to C5) as the optical input/output portions. This example illustrates the optical multiplexer/demultiplexer 1 that individually inputs/outputs four kinds of lights with a single wavelength (hereinafter also referred to as monochromatic lights) corresponding to four transmission channels. This optical multiplexer/demultiplexer 1 includes four optical fiber collimators (hereinafter also referred to as demultiplexing collimators C1 to C4) serving as the optical input/output portions, that is, entrances and exits of the monochromatic lights with respective wavelengths. The optical multiplexer/demultiplexer 1 also includes one optical fiber collimator (hereinafter also referred to as a multiplexing collimator C5), and the optical fiber collimator serves as an input/output portion of a light (hereinafter also referred to as a multiplexed light) which is obtained by multiplexing the four kinds of monochromatic lights. FIG. 1A and FIG. 1B illustrate optical paths when the optical multiplexer/demultiplexer 1 operates as the optical multiplexer.

As illustrated in FIG. 1A and FIG. 1B, a direction in which monochromatic lights L1 to L4 input into/output from the demultiplexing collimators C1 to C4 is defined as a front-rear direction (a first direction). A direction in which the monochromatic lights L1 to L4 to be multiplexed by the optical multiplexer/demultiplexer 1 advances the demultiplexing collimators C1 to C4 is defined as the front. A direction from the rear to the front is defined as a positive z-axis direction. All the optical fiber collimators C1 to C5 are disposed fixed on a flat plate-shaped substrate 10. A normal direction of the substrate 10 is defined as an up-down direction. A direction from below to above is defined as a y-axis direction. A right-handed xyz coordinate system is set to FIG. 1A and FIG. 1B. Accordingly, FIG. 1A is a z-x plan view when the optical multiplexer/demultiplexer 1 is viewed from above. FIG. 1B is a side view when the optical multiplexer/demultiplexer 1 is viewed from right rear.

As illustrated in FIG. 1A, the monochromatic lights L1, L2, L3, and L4 propagate through optical fibers Fb1, Fb2, Fb3, and Fb4 coupled to the rear end sides of the demultiplexing collimators C1 to C4. The monochromatic lights L1, L2, L3, and L4 have the wavelengths of $\lambda_1$, $\lambda_2$, $\lambda_3$, and $\lambda_4$, respectively. While the optical multiplexer/demultiplexer 1 operates as the optical multiplexer, the monochromatic lights L1, L2, L3, and L4 are emitted forward respectively from the opening ends of the demultiplexing collimators C1, C2, C3, and C4. In the front of the demultiplexing collimators C1 to C4, interference film filters F1 to F4 are respectively disposed corresponding to the demultiplexing collimators C1 to C4. The interference film filters F1 to F4 selectively transmit the monochromatic lights L1 to L4 with the wavelengths $\lambda_1$ to $\lambda_4$, and reflect lights other than a light with a transmission wavelength. The interference film filters F1 to F4 each include an interference film which is formed on a surface of a parallel-plate transparent substrate made of quartz glass or the like. The monochromatic lights L1 to L4 emitted from the demultiplexing collimators C1 to C4 respectively enter the interference film filters F1 to F4 at a predetermined incident angle θ, and are emitted at an emission angle θ.

On optical paths of lights (L11, L13, L15, and L17) emitted from the respective interference film filters F1 to F4, mirrors M1 to M4 are disposed. The mirrors M1 to M4 are configured by forming a dielectric multilayer film and a metal thin film on a surface of the transparent substrate made of quartz glass or a similar material. The lights (L11, L13, and L15) traveling forward from the respective interference film filters F1, F2, and F3 are regularly reflected by the mirrors M1, M2, and M3 at a reflection angle θ, and the lights are respectively directed into the interference film filters F2, F3, and F4. The light L17 traveling forward from the interference film filter F4 is regularly reflected by the mirror M4. A regularly-reflected light L18 enters an opening end of the multiplexing collimator C5. An optical axis direction of the multiplexing collimator C5 matches a direction of the incident light L18 which has been reflect by the mirror M4.

In the optical system constituted of the interference film filters F1 to F4 and the mirrors M1 to M4 in the optical multiplexer/demultiplexer 1, the transmissions and the reflections repeat as follow: lights are transmitted by the interference film filters F1 to F4; lights are reflected by the mirrors M1 to M4; and lights other than the lights with the transmission wavelengths are reflected on the front surfaces of the interference film filters F2 to F4. The multiplexed light formed by multiplexing the respective monochromatic lights with the wavelengths $\lambda_1$ to $\lambda_4$ enters the opening end of the multiplexing collimator C5. The multiplexed light is delivered to an optical communications network in a WDM method, via an optical fiber Fb5 coupled to the rear end side of the multiplexing collimator C5. That is, the multiplexed light is input to optical transmission paths in the optical communications network, or is input to optical elements (e.g. photodiodes) of various devices installed in the optical communications network.

Consider a case in which the optical multiplexer/demultiplexer 1 illustrated in FIG. 1A and FIG. 1B operates as the optical demultiplexer. A multiplexed light L5 propagates the optical fiber Fb5 coupled to the multiplexing collimator C5, and is input to the optical system of the optical multiplexer/demultiplexer 1. The multiplexed light L5 traces inversely the above-described optical paths of the lights L11 to L18; that is, the light traces, in the descending order, the optical paths of the lights L11 to L18. Among the lights entering the interference film filters F4 to F1 from front to rear, the monochromatic lights with the wavelengths that transmit the respective interference film filters F4 to F1 are input to the demultiplexing collimators C4 to C1. Then, via the optical fibers Fb4 to Fb1 coupled to the demultiplexing collimators C4 to C1, these monochromatic lights are input to the various devices installed in the optical communications network. For example, optical signals superimposed with the respective monochromatic lights are transformed into electrical signals.

Currently, there are compact optical transceivers of new standards such as QSFP+ and CFP4, and there is demand for a compact optical multiplexer/demultiplexer 1, which is to be incorporated into such an optical transceiver. Especially, the decrease in the size in the width direction is required. However, in the optical multiplexer/demultiplexer 1 illustrated in FIG. 1A and FIG. 1B, linearly arranged are the optical input/output portions such as the optical fiber collimators C1 to C5. The direction in which the monochromatic lights (L1 to L4 in FIG. 1A) are input/output in the optical input/output portions (C1 to C4 in FIG. 1A) intersects, at a predetermined angle 2θ (FIG. 1A), the direction in which the light (L5 or L18 in FIG. 1A) is input/output in the optical input/output portion (C5 in FIG. 1A). Accordingly, the optical multiplexer/demultiplexer 1 enlarges in a direction corresponding to the width direction in the optical transceiver; this makes it difficult to build the optical multiplexer/demultiplexer 1 in the optical transceiver of new standards.

Embodiments

As described above, a common optical multiplexer/demultiplexer 1 using the interference film filters is difficult to build into an optical transceiver of new standard having a narrow width. Therefore, in optical multiplexers/demultiplexers according to some embodiments disclosed in the present specification, it is possible to reduce their sizes in the width direction, that is, in a direction in which optical input/output portions are arranged. This allows the optical multiplexers/demultiplexers to be easily incorporated into the optical transceiver of new standard. The following describes the optical multiplexers/demultiplexers according to some embodiments.

First Embodiment

Figure 2:
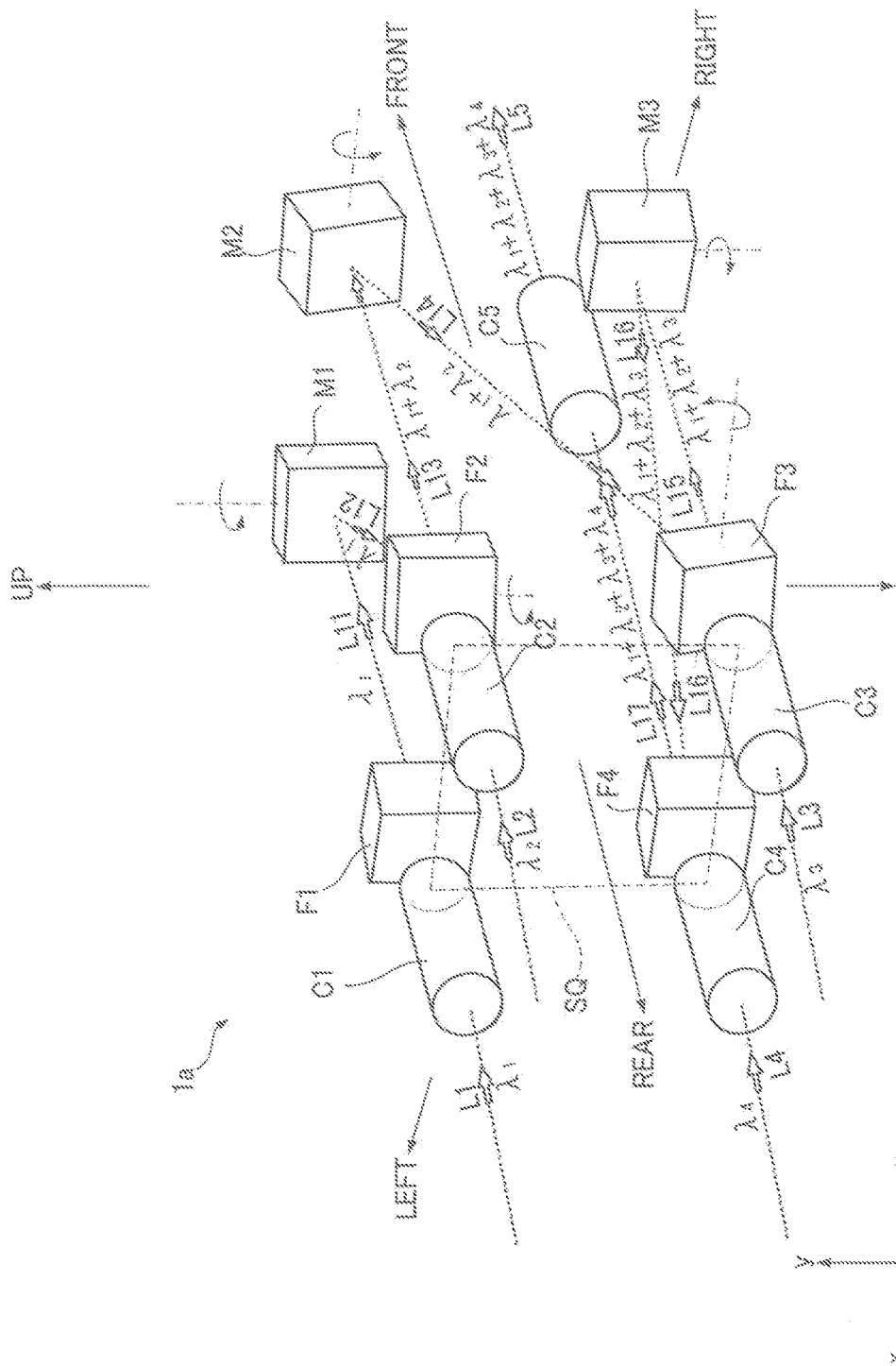
FIG. 2 is a drawing illustrating an outline of an optical system of an optical multiplexer/demultiplexer according to a first embodiment of this disclosure.

FIG. 2 is a perspective view illustrating an optical system of an optical multiplexer/demultiplexer 1a according to the first embodiment of this disclosure. FIG. 2 also illustrates optical paths when the optical multiplexer/demultiplexer 1a according to the first embodiment operates as the optical multiplexer. The optical multiplexer/demultiplexer 1a includes: four demultiplexing collimators C1 to C4 and one multiplexing collimator C5; the four demultiplexing collimators C1 to C4 serve as the optical input/output portions of the respective monochromatic lights with four kinds of the wavelengths $\lambda_1$, $\lambda_2$, $\lambda_3$, and $\lambda_4$. The optical multiplexer/demultiplexer 1a includes: three mirrors M1 to M3 as optical components constituting the optical system; and four interference film filters F1 to F4 corresponding respectively to the demultiplexing collimators C1 to C4. The four interference film filters F1 to F4 selectively transmit the monochromatic lights with the wavelengths $\lambda_1$, $\lambda_2$, $\lambda_3$, and $\lambda_4$. Here, a direction in which the monochromatic lights L1 to L4 input to/output from the respective demultiplexing collimators C1 to C4 travel is defined as a front-rear direction. A side on which the four demultiplexing collimators C1 to C4 have opening ends is defined as "front", and the opposite side as "rear". Defining a direction from rear to front as the positive z-axis direction, the right-handed xyz coordinate system is specified.

The opening ends of the four demultiplexing collimators C1 to C4 are disposed on the identical x-y plane. In this example, the opening ends are disposed at respective apexes of a rectangle SQ on the identical plane. Here, furthermore, viewing the rectangle SQ from rear to front, a direction of arranging a group of the demultiplexing collimators C1 and C2 and a group of the demultiplexing collimators C4 and C3 is defined as an x-axis direction. And, a direction of arranging a group of the demultiplexing collimators C1 and C4 and a group of the demultiplexing collimators C2 and C3 is defined as a y-axis direction. The x-axis direction is defined as a right-left direction, and the y-axis direction is defined as an up-down direction. As illustrated in FIG. 2, regarding the right-left direction and the up-down direction, a direction from right to left is defined as the positive x-axis direction and a direction from below to above is defined as the positive y-axis direction. In the respective embodiments to be described later, the above-described coordinate system, the right-left direction and the up-down direction are employed as well as the first embodiment of this disclosure. The origin of the coordinate system is not especially specified, and surfaces parallel to an x-y plane, a y-z plane, and a z-x plane are all referred to as an x-y plane, a y-z plane, and a z-x plane. Further, it is assumed that the demultiplexing collimators C1 to C4 and the multiplexing collimator C5 have optical axes in the z-axis direction.

As illustrated in FIG. 2, in front of the respective demultiplexing collimators C1 to C4, the interference film filters F1 to F4 are disposed which selectively transmit the wavelengths $\lambda_1$ to $\lambda_4$. In front of the interference film filters F1 to F3 corresponding to the demultiplexing collimators C1 to C3, the mirrors M1 to M3 are additionally disposed. In front of the interference film filter F4, the multiplexing collimator C5 is disposed.

Here, based on the optical paths illustrated in FIG. 2, the following describes the arrangement of the demultiplexing collimators C1 to C4, the multiplexing collimator C5, and the optical components constituting the optical system. The mirror M1 is disposed so as to reflect the light L11 toward the interference film filter F2; the light L11 has been emitted forward from the demultiplexing collimator C1 and has transmitted the interference film filter F1. Note that the interference film filter F1 is not an essential element as long as the monochromatic light L1 input to/output from the demultiplexing collimator C1 has a significantly sharp wavelength characteristic at the single wavelength $\lambda_1$.

The interference film filter F2 reflects forward along the z-axis the light L12 which has been reflected by the mirror M1. The reflected light L13 enters the mirror M2. Accordingly, the monochromatic light L1 with the wavelength $\lambda_1$ from the demultiplexing collimator C1 traces the optical paths (L11 to L13) which are in the identical z-x plane. And, the monochromatic light L1 is sequentially reflected by the mirror M1 and the interference film filter F2 to reach the mirror M2. The monochromatic light L2 with the wavelength $\lambda_2$ comes from the demultiplexing collimator C2, and when transmitting the interference film filter F2, the monochromatic light L2 multiplexes with the light L12 entering from the mirror M1 into this interference film filter F2. As a result, the light of multiplexing the monochromatic lights each having the wavelengths $\lambda_1$ and $\lambda_2$ travels toward the mirror M2.

The mirror M2 is disposed to reflect, downward in the y-z plane, the light which has entered traveling forward along the z-axis. The reflected light L14 which has been reflected by the mirror M2 enters the interference film filter F3, which is disposed below the collimator C2 and in the front of the collimator C3. The interference film filter F3 reflects, forward along the z-axis, the light L14 reflected by the mirror M2 while the monochromatic light L3 with the wavelength $\lambda_3$ from the demultiplexing collimator C3 transmits the interference film filter F3. Accordingly, the transmitted light travelling from the rear and the entered light L14 travelling from front are multiplexed at the interference film filter F3. Consequently, a light L15 including the monochromatic lights each having the wavelengths $\lambda_1$ to $\lambda_3$ travel to the mirror M3.

The mirror M3 is disposed so as to reflect, toward the interference film filter F4, the light L15 which has entered traveling forward from the interference film filter F3. The interference film filter F4 reflects, forward along the z-axis, a multiplexed light L16 which has been reflected by the mirror M3 and which includes the lights each having the wavelengths $\lambda_1$ to $\lambda_3$ while the monochromatic light L4 with the wavelength $\lambda_4$ from the demultiplexing collimator C4 transmits the interference film filter F4. Accordingly, the monochromatic light L4 with the wavelength $\lambda_4$ is multiplexed with the light L16 including the lights each having the wavelengths $\lambda_1$ to $\lambda_3$. Consequently, a multiplexed light L17 including the lights each having the wavelengths $\lambda_1$ to $\lambda_4$ travels forward along the z-axis. This light L17 from interference film filter F4 is input to the multiplexing collimator C5. Finally, this light L17 is delivered, as an output light from this optical multiplexer/demultiplexer 1a, to the optical communications network via the optical fiber Fb5, which is coupled to the front end of the multiplexing collimator C5. In the optical multiplexer/demultiplexer 1a including the above-described optical system, the monochromatic light L1 emitted forward from the demultiplexing collimator C1 is multiplexed with the monochromatic lights L2 to L4 having other wavelengths while tracing a square U-shaped optical path when viewed from the rear, which traces the contour of the rectangular region SQ clockwise from the demultiplexing collimators C1 to C4. When the optical multiplexer/demultiplexer 1a operates as the optical demultiplexer, the multiplexed light L5 in which all lights of wavelengths $\lambda_1$ to $\lambda_4$ are multiplexed is emitted rearward from the collimator C5, and subsequently the multiplexed light L5 traces inversely the optical paths of the lights L11 to L17; that is, the light traces, in the descending order, the optical paths of the lights L11 to L17. In the middle of the optical paths traced by the multiplexed light L5, the lights corresponding to the lights L17, L15, L13, and L11 traveling from front to rear along the z-axis enter the interference film filters F4, F3, F2, and Fl. The monochromatic lights of the wavelengths $\lambda_4$, $\lambda_3$, $\lambda_2$, and $\lambda_1$ transmit respectively the interference film filters F4, F3, F2, and F1 and are input to the collimators C4, C3, C2, and C1.

Figure 3A:
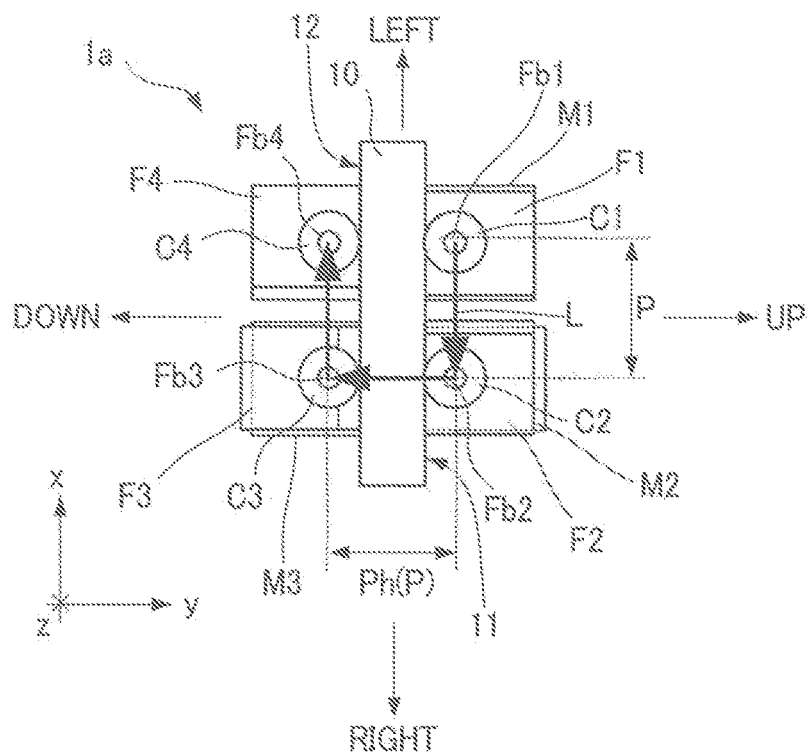
FIG. 3A is a drawing illustrating the configuration of the optical multiplexer/demultiplexer according to the first embodiment of this disclosure.
Figure 3B:
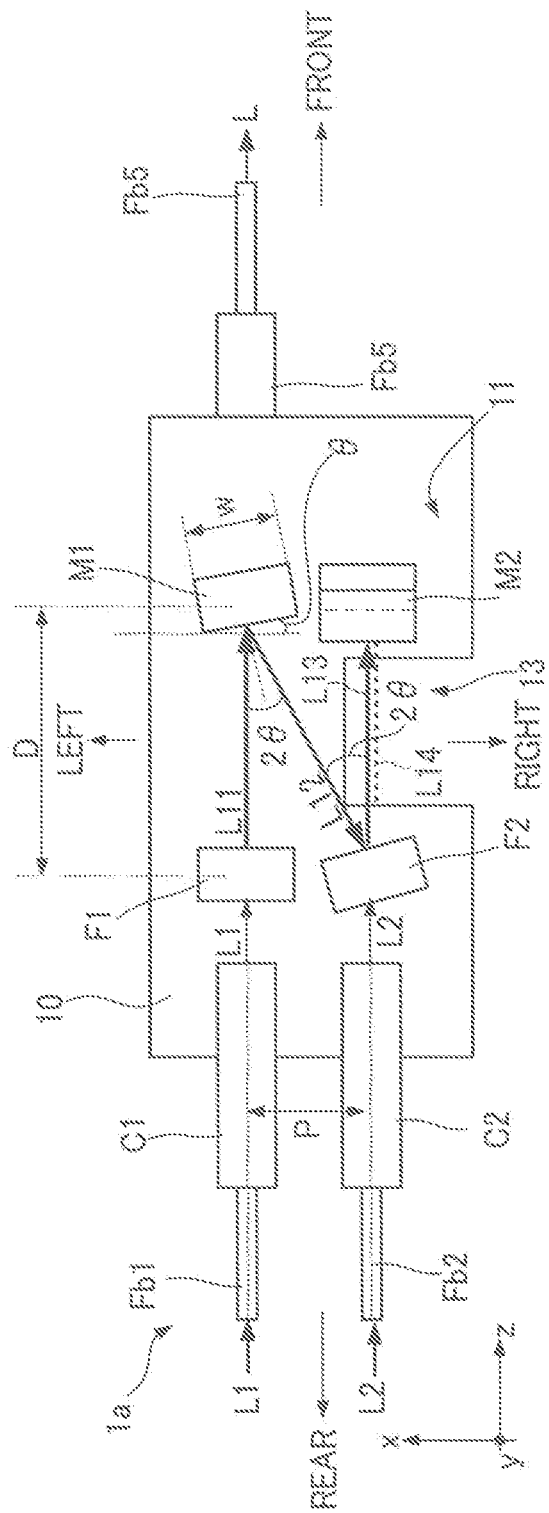
FIG. 3B is a drawing illustrating the configuration of the optical multiplexer/demultiplexer according to the first embodiment of this disclosure.
Figure 3C:
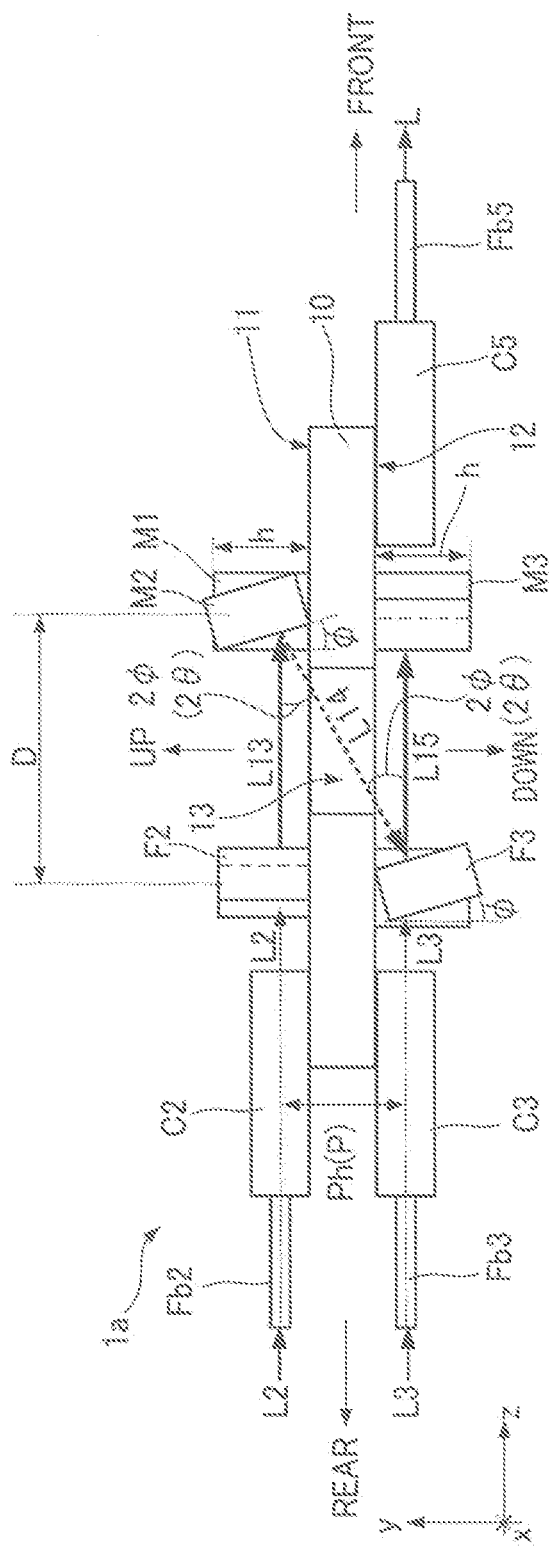
FIG. 3C is a drawing illustrating the configuration of the optical multiplexer/demultiplexer according to the first embodiment of this disclosure.
Figure 3D:
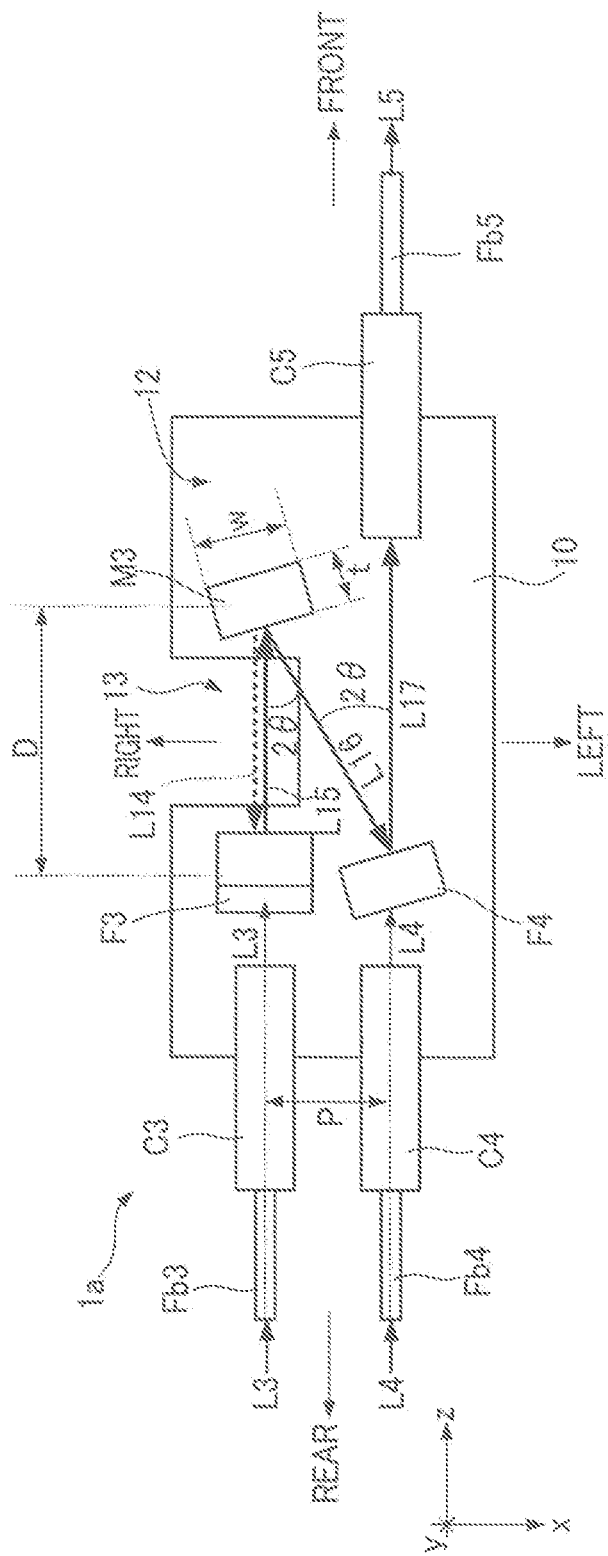
FIG. 3D is a drawing illustrating the configuration of the optical multiplexer/demultiplexer according to the first embodiment of this disclosure.

The following describes a further specific configuration of the optical multiplexer/demultiplexer 1a according to the first embodiment of this disclosure. FIG. 3A, FIG. 3B, FIG. 3C, and FIG. 3D are drawings illustrating the configuration of the optical multiplexer/demultiplexer 1a. FIG. 3A is a rear view of the optical multiplexer/demultiplexer 1a, FIG. 3B is a plan view viewed from above, FIG. 3C is a side view viewed from right, and FIG. 3D is a plan view viewed from below. In FIG. 3A, FIG. 3B, FIG. 3C, and FIG. 3D, the optical paths when the optical multiplexer/demultiplexer 1a operates as the optical multiplexer are illustrated.

The interference film filters F1 to F4 and the mirrors M1 to M3 which constitute the optical system of the optical multiplexer/demultiplexer 1a according to the first embodiment of this disclosure. The interference film filters F1 to F4 and the mirrors M1 to M3 are disposed on both the upper and lower surfaces (11, 12) of the flat plate-shaped substrate 10, which is along a z-x plane. The interference film filters F1 and F2 and the mirrors M1 and M2 are disposed being fixed on the upper surface 11. The demultiplexing collimators C1 and C2 are also disposed on the upper surface of the substrate 10 and are fixed by an appropriate holding structure not illustrated in FIG. 3A, FIG. 3B, FIG. 3C, and FIG. 3D. The demultiplexing collimators C3 and C4, the multiplexing collimator C5, the interference film filters F3 and F4, and the mirror M3 are disposed being fixed on the lower surface 12. The demultiplexing collimators C1 to C4 have opening ends on the front ends, and the multiplexing collimator C5 has an opening end on the rear end. These opening ends serve as the optical input/output portions in this optical multiplexer/demultiplexer 1a. A rectangular cutout portion 13 is disposed on the right end of the substrate 10, and the cutout portion 13 communicates between both upper and lower surfaces (11-12) to pass the optical path in the y-z plane formed between the mirror M2 and the interference film filter F3.

As illustrated in FIG. 3B, the interference film filter F1 has a surface in which the light enters/is emitted and which extends along the x-y plane. The reflecting surface of the mirror M1 is inclined about the y-axis anticlockwise by the angle θ with respect to the x-y plane when viewed from above to below. That is, the light L11 enters the mirror M1 at the incident angle θ. The surface for entering/emitting the light of the interference film filter F2 is inclined about the y-axis, when viewed from below to above, anticlockwise by the angle θ with respect to the x-y plane so that the entering/emitting surface faces the mirror M1.

That is, the surface for entering/emitting the light of the interference film filter F2 is inclined about the y-axis anticlockwise by the angle e with respect to the optical axis of the demultiplexing collimator C2. Accordingly, the light L12 from the mirror M1 enters the interference film filter F2 by the incident angle θ. The angle θ is set based on a distance D and a distance P: the distance D is a distance in the front-rear direction between the mirror M2 and the interference film filter F2 on the upper surface 11 of the substrate; and the distance P is a distance in the right-left direction between the demultiplexing collimators C1 and C2 on the upper surface 11 of the substrate.

As illustrated in FIG. 3C, the reflecting surface of the mirror M2 is inclined about the x-axis, when viewed from right to left, anticlockwise by the angle φ with respect to the x-y plane so that the normal direction of the mirror M2 faces downward and backward. Accordingly, the light L13 entering the mirror M2 travels, through the cutout portion 13 formed on the substrate 10, toward the interference film filter F3 disposed on the lower surface 12 of the substrate 10. The angle φ is set based on the distance D and a distance Ph: the distance D is a distance in the front-rear direction between the mirror M2 and the interference film filter F2 on the upper surface 11 of the substrate; and a distance Ph is a distance in the up-down direction between the demultiplexing collimator C2 on the upper surface 11 of the substrate and the demultiplexing collimator C3 on the lower surface 12 of the substrate. The surface for entering/emitting the light of the interference film filter F3 is inclined about the x-axis, when viewed from right to left, anticlockwise by the angle φ with respect to the x-y plane so that the entering/emitting surface faces the mirror M2 disposed on the upper surface 11 of the substrate 10. Accordingly, an angle formed by the light L14 traveling from the upper surface 11 toward the lower surface 12 via the cutout portion 13 and the optical axis of the demultiplexing collimator C3 becomes 2φ as illustrated in FIG. 3C.

As illustrated in FIG. 3D, the reflecting surface of the mirror M3 disposed on the lower surface 12 is inclined about the y-axis anticlockwise by the angle θ with respect to the x-y plane when viewed from below to above. That is, the light L15 from the interference film filter F3 enters the mirror M3 by the incident angle θ. The surface for entering/emitting the light of the interference film filter F4 is inclined about the y-axis, when viewed from below to above, anticlockwise by the angle θ with respect to the x-y plane so that the entering/emitting surface faces the mirror M3. That is, the light L16 from the mirror M3 enters the interference film filter F4 by the incident angle θ. Therefore, the light L16 entering the interference film filter F4 is reflected forward along the z-axis direction. The multiplexing collimator C5 is disposed in the optical path of the reflected light L17. In the optical multiplexer/demultiplexer 1a according to the first embodiment, the demultiplexing collimators C1 to C4, the interference film filters F1 to F4, the mirrors M1 to M3, and the multiplexing collimator C5 are disposed as described above, and therefore an optical path L when this optical multiplexer/demultiplexer 1a is viewed from the rear has a square U-shape formed by tracing the positions of the demultiplexing collimators C1 to C4 in this order, as illustrated in FIG. 3A.

In the optical multiplexer/demultiplexer 1a having the foregoing configuration, the interference film filters F2 to F4 are inclined with respect to the optical axes of the corresponding demultiplexing collimators C2 to C4. But, if the film surface of the interference film filter is largely inclined with respect to the direction of transmission of the light, when the light transmits the interference film filter, this generally causes a difference in optical intensity between a P wave and an S wave, the waves vibrating in directions perpendicular to one another. That is, this causes polarization dependency in insertion loss. Also, polarization mode dispersion occurs, in which a difference between the P wave and the S wave in propagation velocity generates. As for a mirror, if its reflective film is a dielectric film, the mirror has wavelength dependence and angular dependence in reflectivity. Taking the above-described various dependences and similar factors into consideration, this embodiment sets the angles to $\theta \leq 15°$ and $\varphi \leq 15°$.

The following describes the wavelengths of the lights demultiplexed and multiplexed by the optical multiplexer/demultiplexer 1a according to the first embodiment, the specific sizes and angles of the portions of the optical multiplexer/demultiplexer 1a, and similar matters. First, the wavelengths of the monochromatic lights input to/output from the respective demultiplexing collimators C1, C2, C3, and C4 are $\lambda_1$=1271 nm, $\lambda_2$=1291 nm, $\lambda_3$=1311 nm, and $\lambda_4$=1331 nm. The distance P in the right-left direction between the demultiplexing collimators (C1-C2, C3-C4) is P=4 mm.

A surface of each of the interference film filters F1 to F4 is an interference film surface, which is formed on a surface of a transparent substrate having the rectangular shape of w 1.4 mm×h 1.4 mm and with the refractive index n=1.5 and a thickness t=1 mm. Similarly, the reflecting surfaces of the mirrors M1 to M3 are formed on a surface of a transparent substrate having the rectangular shape of w 1.4 mm×h 1.4 mm and with the refractive index n=1.5 and a thickness t=1 mm. The thickness of the interference film surface and the reflecting surface are thin, negligible relative to the thickness t of the transparent substrate. The inter-center distance D in the up-down direction between the positions where the interference film filters F1 to F4 are disposed and the positions where the mirrors M1 to M3 are disposed is about 8.5 mm. Accordingly, the angle $\theta$ is set to $\theta$=13.5° based on the distance P and the inter-center distance D. The angle $\theta$ may be set in advance, and the distance P and the inter-center distance D may be set based on the angle $\theta$. The angle $\varphi$ is set to $\varphi = \theta = 13.5°$ such that the distance Ph of the demultiplexing collimators becomes P=Ph; in this example, Ph=P=4 mm. Thus, the optical multiplexer/demultiplexer 1a according to the first embodiment has a size small enough to incorporate into an optical transceiver of the above-described standard such as QSFP+ and CFP4. Also, the two optical multiplexers/demultiplexers 1a can be incorporated into the optical transceiver so as to be in line to right and left; the two optical multiplexers/demultiplexers 1a respectively serve as an optical multiplexer and an optical demultiplexer.

Second Embodiment

The interference film filter has a structure in which an interference film is formed on a surface of the transparent substrate. When the light obliquely enters the surface of the interference film of the interference film filter, the position of the emitted light shifts in the x-y plane from the position of the entered light due to the refractive index of the transparent substrate. That is, the optical path of the light transmitting the interference film filter shifts between before and after the transmission. Therefore, the optical multiplexer/demultiplexer according to the second embodiment includes the demultiplexing collimators and the multiplexing collimator at positions which reflect the shift of the optical path.

Figure 4A:
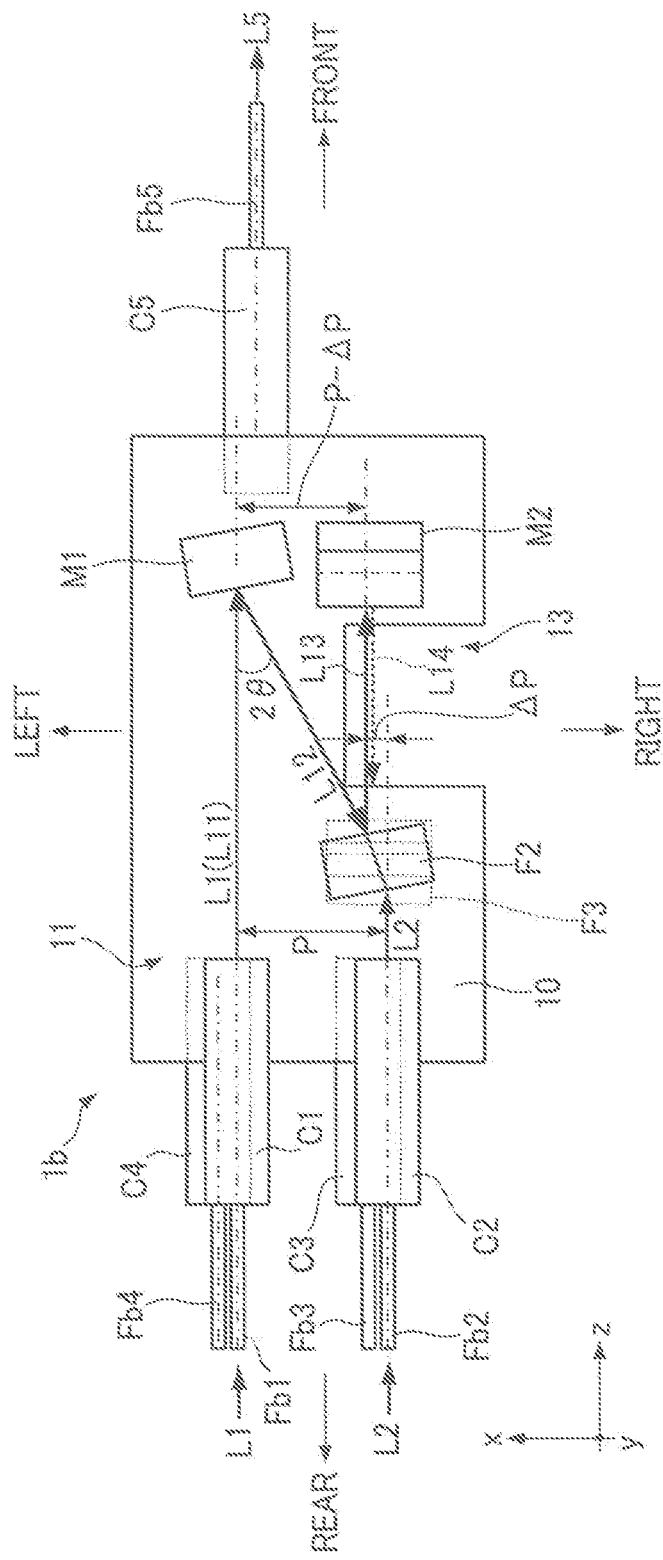
FIG. 4A is a drawing illustrating a configuration of an optical multiplexer/demultiplexer according to a second embodiment of this disclosure.
Figure 4B:
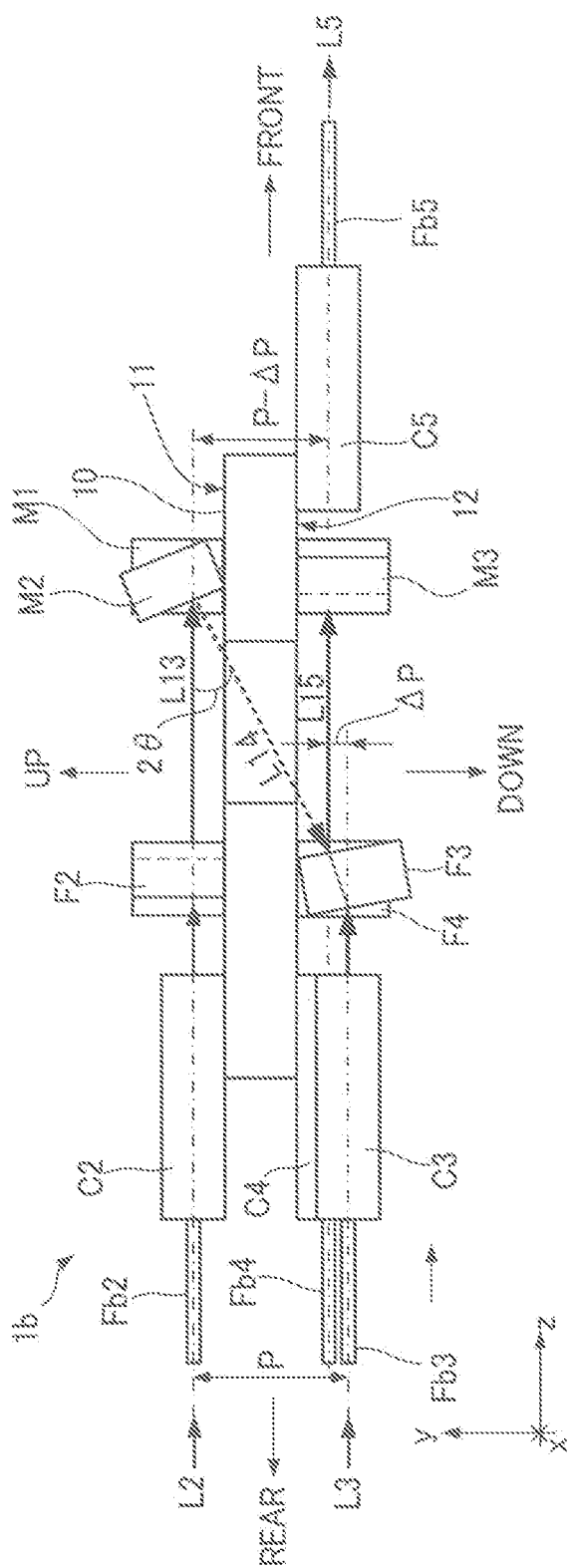
FIG. 4B is a drawing illustrating the configuration of the optical multiplexer/demultiplexer according to the second embodiment of this disclosure.
Figure 4C:
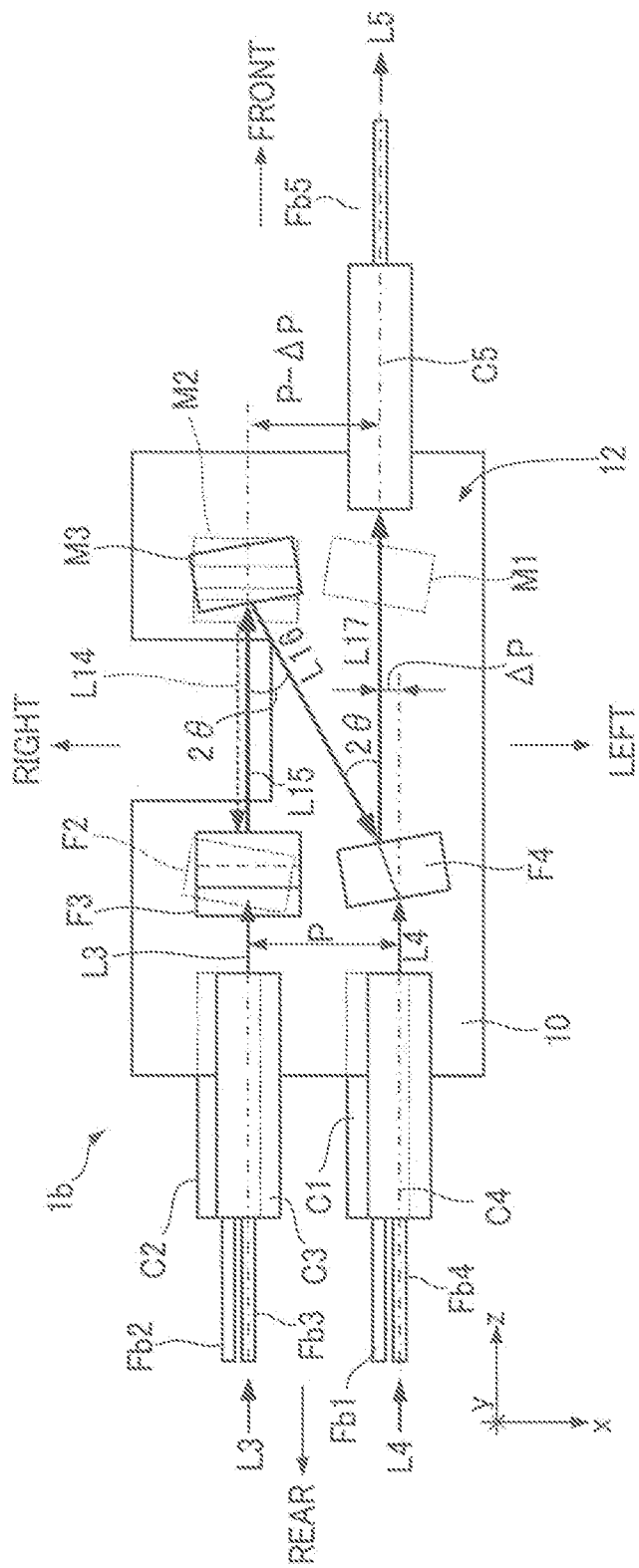
FIG. 4C is a drawing illustrating the configuration of the optical multiplexer/demultiplexer according to the second embodiment of this disclosure.

FIG. 4A, FIG. 4B, and FIG. 4C illustrate the arrangements of the optical components in an optical multiplexer/demultiplexer 1b according to the second embodiment of this disclosure. FIG. 4A is a plan view of the optical multiplexer/demultiplexer 1b when viewed from above. FIG. 4B is a side view of the optical multiplexer/demultiplexer 1b when viewed from right. FIG. 4C is a plan view of the optical multiplexer/demultiplexer 1b when viewed from below. As illustrated in FIG. 4A, in the optical multiplexer/demultiplexer 1b according to the second embodiment, omitted is the interference film filter F1 corresponding to the demultiplexing collimator C1. However, the optical components constituting the optical system and the basic structure except for the interference film filter F1 are similar to the first embodiment illustrated in FIG. 3A, FIG. 3B, FIG. 3C, and FIG. 3D. The optical multiplexer/demultiplexer 1b according to the second embodiment illustrated in FIG. 4A, FIG. 4B, and FIG. 4C operates as the optical multiplexer.

The following describes the arrangement of the demultiplexing collimators C1 to C4 and the multiplexing collimator C5 of the optical multiplexer/demultiplexer 1b according to the second embodiment. First, as illustrated in FIG. 4A, the demultiplexing collimators C1 and C2 are disposed on the upper surface 11 of the substrate 10 separated by the distance P. The monochromatic lights L1 and L2 with the wavelengths $\lambda_1$ and $\lambda_2$ enter from the respective demultiplexing collimators C1 and C2. The monochromatic light L2 enters the interference film filter F2, and refracts in the transparent substrate. Before and after the transmission through the interference film filter F2, the monochromatic light L2 shifts by a distance $\Delta$P according to the refractive index and the thickness t of the transparent substrate. Therefore, the mirror M1 and the interference film filter F2 are disposed so that the light L12 traveling from the mirror M1 to the interference film filter F2 enters a position in the interference film filter F2 at which the monochromatic light L2 emits. Then, a distance in the right-left direction between the light L11 traveling from the demultiplexing collimator C1 to the mirror M1 and the light L13 traveling from the interference film filter F2 to the mirror M2 becomes P−$\Delta$P.

Next, the light L13 traveling from the interference film filter F2 to the mirror M2 is reflected by the mirror M2 and enters the interference film filter F3. As illustrated in FIG. 4B, the surface for entering/emitting the light of the interference film filter F3 is tilted (being rotated from the position perpendicular to the optical axis around the x-axis) with respect to the optical axis of the corresponding demultiplexing collimator C3, but the entering/emitting surface is not rotated around the y-axis. Accordingly, the monochromatic light L3 traveling from the demultiplexing collimator C3 to the interference film filter F3 has no shift in the x-axis direction between before and after the transmission through the interference film filter F3. However, since the surface for entering/emitting the light of the interference film filter F3 is inclined being rotated from the position perpendicular to the optical axis around the x-axis, the monochromatic light L3 emitted from the demultiplexing collimator C3 has an upward shift in the y-axis direction before and after the transmission through the interference film filter F3. Since the mirror M2 on the upper surface 11 of the substrate is inclined by the angle θ with respect to the optical axis of the demultiplexing collimator C2, the interference film filter F3 is also inclined about the x-axis by the angle θ with respect to the optical axis of the demultiplexing collimator C3 on the lower surface 12 of the substrate. Accordingly, the monochromatic light L3 input from the demultiplexing collimator C3 has a shift upward by ΔP between before and after the transmission through the interference film filter F3. Since the reflecting surface on the mirror M3 is not inclined about the x-axis, the lights L16 and L17 thereafter reaching the multiplexing collimator C5 via the interference film filter F4 do not shift in the up-down direction. Accordingly, the distance between the demultiplexing collimators C1 and C4 on the upper surface 11 and the lower surface 12 of the substrate 10 is set to P−ΔP, and the distance between the demultiplexing collimators C2 and C3 is set to P.

As illustrated in FIG. 4C, the reflecting surface of the mirror M3 is inclined about the y-axis anticlockwise by the angle θ with respect to the x-y plane when viewed from below to above. The surface for entering/emitting the light of the interference film filter F4 is inclined about the y-axis anticlockwise by the angle θ with respect to the x-y plane when viewed from below to above. The light L17 traveling from the interference film filter F4 to the multiplexing collimator C5 is parallel to the optical axis of the demultiplexing collimator C4. Accordingly, similar to the case where the monochromatic light L2 transmits the interference film filter F2 on the upper surface 11 of the substrate, the monochromatic light L4 emitted from the demultiplexing collimator C4 shifts rightward by the distance ΔP. That is, the demultiplexing collimators C3 and C4 on the lower surface 12 of the substrate are separated in the right-left direction by the distance P, and are each disposed at a position shifted leftward by ΔP with respect to the demultiplexing collimators C1 and C2 on the upper surface 11 of the substrate.

A distance in the right-left direction between the demultiplexing collimator C3 and the multiplexing collimator C5 is set to P−ΔP. As a specific example of the value of the ΔP in the interference film filters F2 to F4, the value ΔP is about 0.1 mm assuming that: the distance P between the demultiplexing collimators C1 and C2=4 mm; the thickness t of the transparent substrates of the respective interference film filters F2 and F3=1 mm; and the refractive indices n of these transparent substrates=1.5.

Thus, in the optical system of the optical multiplexer/demultiplexer 1b according to the second embodiment, the respective optical fiber collimators C1 to C5 are disposed at the optimal positions which reflect the shift of the lights transmitting the interference film filters F2 to F4. This allows reducing coupling loss of the lights input to the respective optical fiber collimators C1 to C5. Needless to say, in the case where, when viewed from rear to front, the demultiplexing collimators C1 to C4 are disposed at the respective apexes of a square (the length of the sides is P) and the multiplexing collimator C5 is disposed at a position identical to the demultiplexing collimator C4, it is sufficient to set individually the respective inclination angles of the reflecting surfaces on the mirrors M1 to M3 and the surfaces for entering/emitting the lights of the interference film filters F2 to F4. In any case, disposing the demultiplexing collimators C1 to C4 and the multiplexing collimator C5 at the positions which reflect the shifts of the optical paths in the interference film filters F2 to F4 allows reducing the optical loss.

Third Embodiment

In the optical multiplexer/demultiplexer according to the first and the second embodiments, the demultiplexing collimators are disposed in two lines and two rows on a single plane when viewed from the rear, and this makes it possible to reduce the width in the right-left direction. An optical multiplexer/demultiplexer according to the third embodiment has a configuration in which the size in the front-rear direction can be further decreased.

Figure 5A:
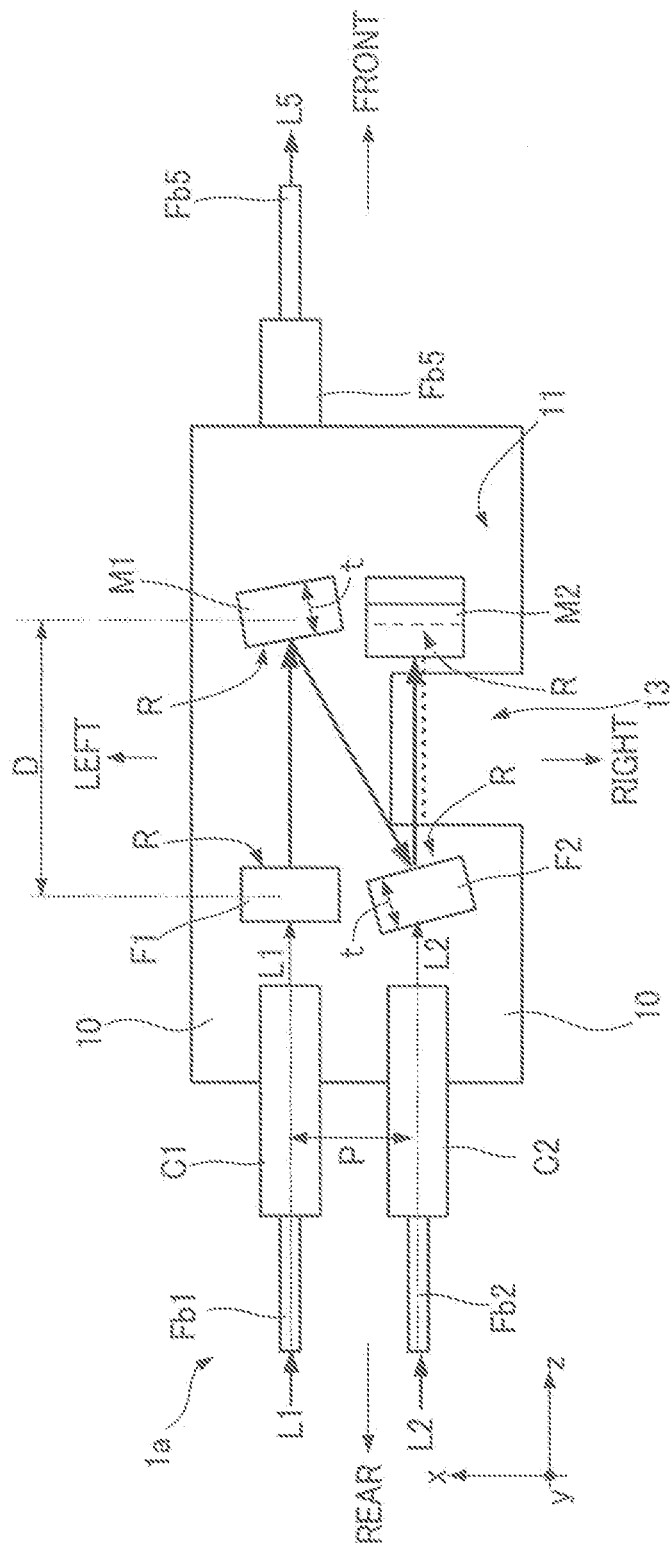
FIG. 5A is a drawing illustrating a configuration of an optical multiplexer/demultiplexer according to a third embodiment of this disclosure.
Figure 5B:
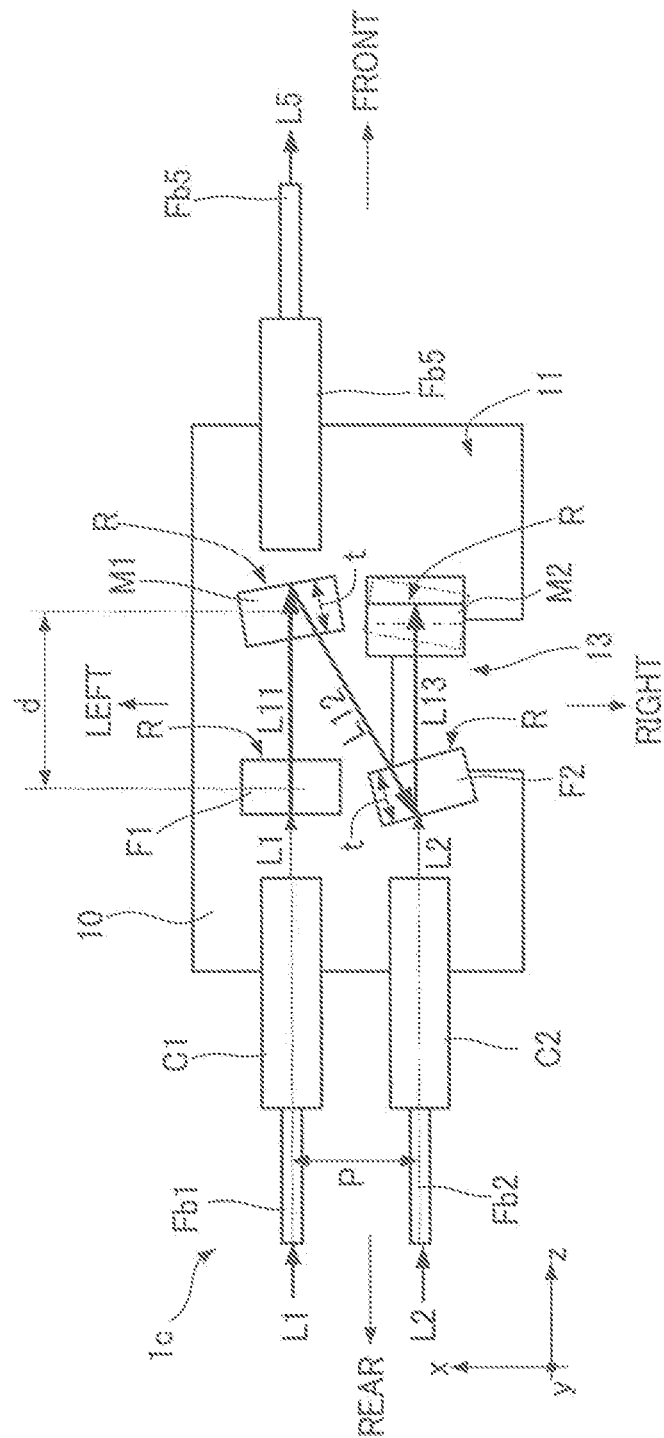
FIG. 5B is a drawing illustrating the configuration of the optical multiplexer/demultiplexer according to the third embodiment of this disclosure.

FIG. 5A is a plan view of the optical multiplexer/demultiplexer 1a according to the foregoing first embodiment when viewed from above. FIG. 5B is a plan view of an optical multiplexer/demultiplexer 1c according to the third embodiment when viewed from above. In the optical multiplexer/demultiplexer 1a according to the first embodiment illustrated in FIG. 5A, the mirrors M1 and M2 and the mirror M3 (not shown in FIG. 5A) are top-surface-reflecting mirrors in which a mirror surface is formed on the light-incident surface of a transparent substrate with the predetermined thickness. Also, the interference film filters F1 and F2 and the interference film filters F3 and F4 (not shown in FIG. 5A) are also top-surface-reflecting ones. That is, in each interference film filter, the surface of the transparent substrate on which the interference film is formed is a reflecting surface R, and the reflecting surface R is a surface located on the side where the reflected light from one of the mirrors M1 to M3 enter.

Meanwhile, the optical multiplexer/demultiplexer 1c according to the third embodiment of this disclosure illustrated in FIG. 5B is a back-surface-reflecting one in which the reflecting surfaces R of the mirrors M1 and M2 and the mirror M3 (not shown in FIG. 5B) and the reflecting surfaces R of the interference film filters F1 and F2 and the interference film filters F3 and F4 (not shown in FIG. 5B) are formed on the back surfaces opposite to the surfaces for entering the lights. Accordingly, the lights striking the mirrors M1 to M3 and the interference film filters F1 to F4 propagate inside the transparent substrates and are reflected by the reflecting surfaces R on the back surfaces. Consequently, the optical multiplexer/demultiplexer 1c according to the third embodiment can reduce the size in the front-rear direction compared with the optical multiplexer/demultiplexer 1a according to the first embodiment. As described above, in the optical multiplexer/demultiplexer 1a according to the first embodiment, the inter-center distance D is about 8.5 mm. On the other hand, an inter-center distance d of the optical multiplexer/demultiplexer 1c according to the third embodiment is 7.2 mm, and this reduces the size by about 1.3 mm. Needless to say, it is acceptable that the mirrors and the interference film filters all are not configured to be a back-surface-reflecting one but either one of the optical components among the mirrors and the interference film filters is configured to be a back-surface-reflecting one.

In back-surface-reflecting types of mirror and interference film filter, there is a risk of optical loss due to a multiple reflection of the light which has reflected by the back surface on the transparent substrate, inside the transparent substrate. In the case where the optical loss is apprehended, it is sufficient that both front and back surfaces of the transparent substrate are not configured to be parallel to one another but the directions of the surfaces are changed from the parallel state by a slight angle (for example, 0.1°). Changing the directions of both front and back surfaces of the transparent substrate from the parallel state refracts the light directed onto the transparent substrate because of the principle similar to the second embodiment, and the optical path shifts. However, as long as the angle by which the directions are changed is significantly small, the shift of the optical path is actually negligible. Needless to say, similar to the second embodiment, the respective demultiplexing collimators may be disposed taking the shift of the optical path into consideration.

Fourth Embodiment

With the optical multiplexers/demultiplexers according to the respective embodiments, the multiplexing collimator C5 is disposed at the position determined according to the positions of the demultiplexing collimators C1 to C4 and the arrangement of the mirrors M1 to M3 and the interference film filters F2 to F4. The multiplexing collimator C5 has the opening end on the rear. The optical multiplexer/demultiplexer according to the fourth embodiment has a configuration in which the arrangement of the multiplexing collimator C5 can be freely configured.

Figure 6A:
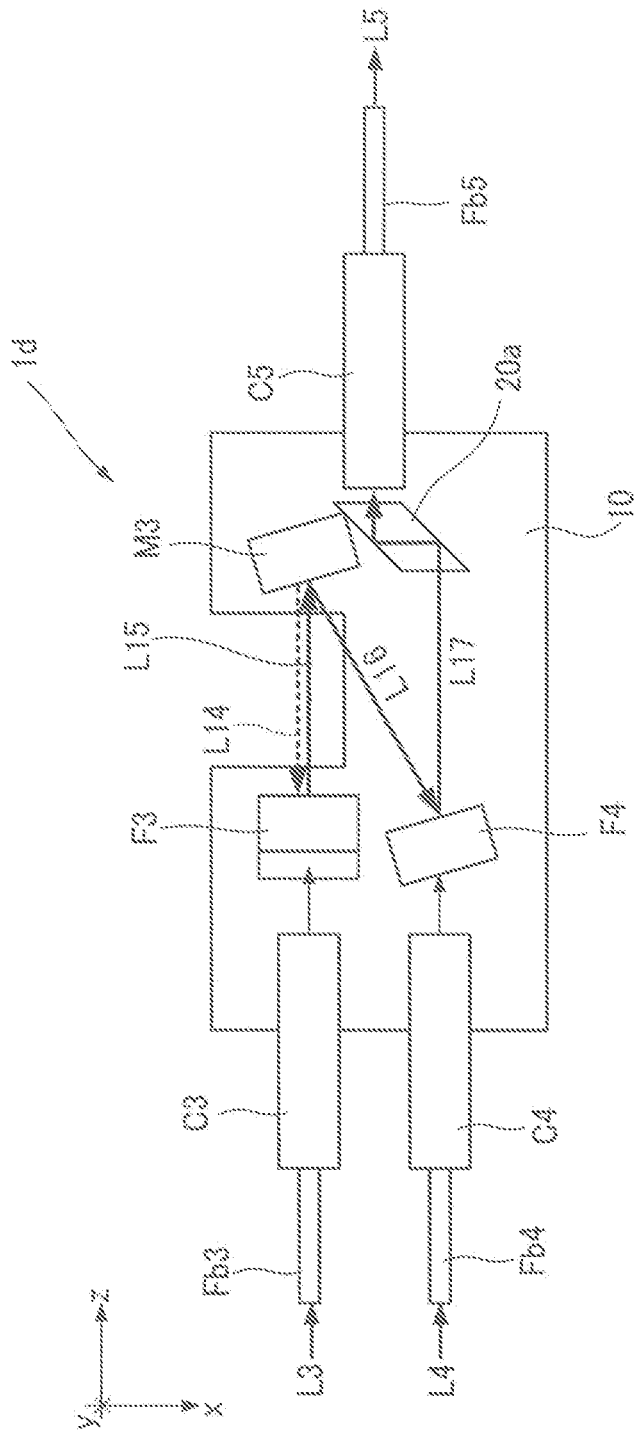
FIG. 6A is a drawing illustrating a configuration of an optical multiplexer/demultiplexer according to a fourth embodiment of this disclosure.
Figure 6B:
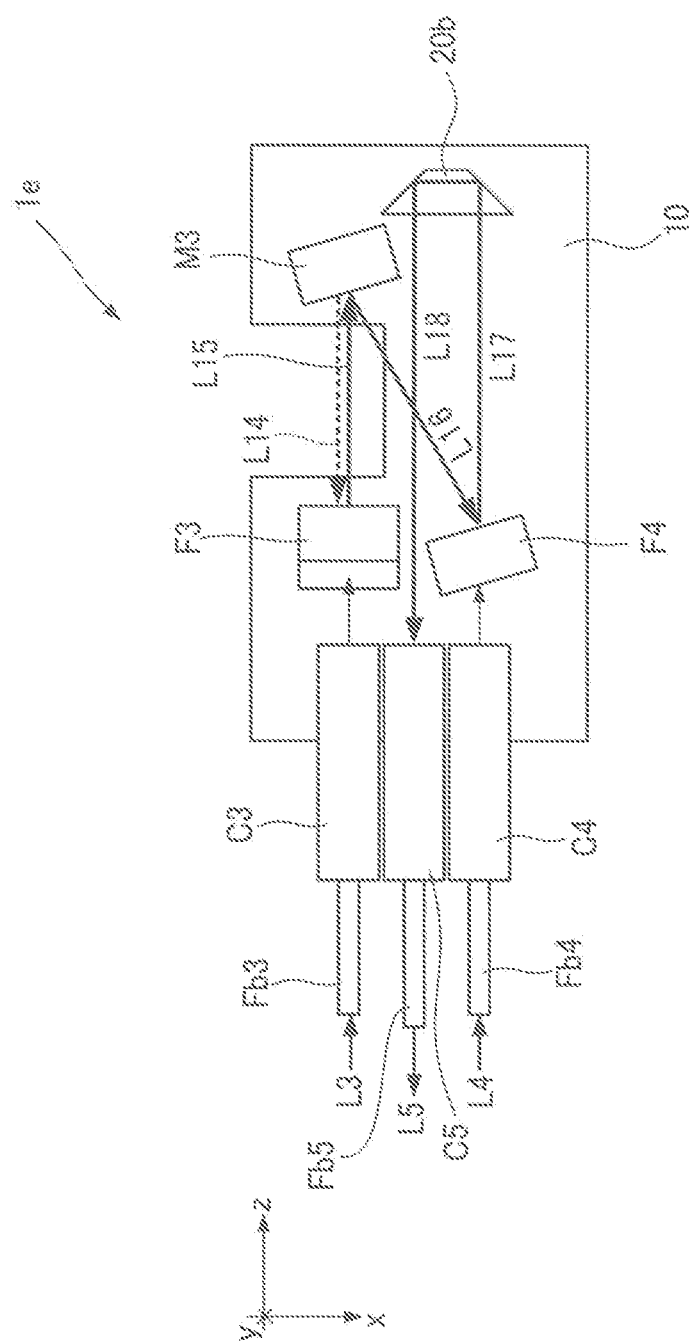
FIG. 6B is a drawing illustrating the configuration of the optical multiplexer/demultiplexer according to the fourth embodiment of this disclosure.

FIG. 6A and FIG. 6B each illustrate the schematic configuration of the optical multiplexer/demultiplexer according to the fourth embodiment of this disclosure. FIG. 6A and FIG. 6B are plan views of the optical multiplexer/demultiplexer (1d, 1e) according to the fourth embodiment when viewed from below. The optical multiplexer/demultiplexer (1d, 1e) according to the fourth embodiment illustrated in FIG. 6A and FIG. 6B includes an optical path deflecting portion (20a, 20b) which is formed between the interference film filter F4 and the multiplexing collimator C5, and which bends the optical path in the middle of the optical path.

In an optical multiplexer/demultiplexer 1d according to the fourth embodiment of this disclosure illustrated in FIG. 6A, the optical path deflecting portion 20a formed of a diamond prism is interposed on the optical path between the demultiplexing collimator C4 and the multiplexing collimator C5. After the light L17 traveling from the interference film filter F4 to the multiplexing collimator C5 is bent rightward, the light L17 is bent forward again, thus forming a crank-shaped optical path between the interference film filter F4 and the multiplexing collimator C5. The light traveling forward from the intermediate position between the respective optical axes of the demultiplexing collimators C3 and C4 is input to the multiplexing collimator C5. Accordingly, when viewed from the rear, the multiplexing collimator C5 is disposed at the intermediate position between the demultiplexing collimators C3 and C4.

The optical path deflecting portion 20b of an optical multiplexer/demultiplexer 1e according to the fourth embodiment illustrated in FIG. 6B is constituted of, for example, a right-angled prism or an isosceles trapezoid prism formed by flattening apexes of a right-angled prism. Thus, the light L17 traveling from the interference film filter F4 to the multiplexing collimator C5 turns back rearward toward the intermediate position between the demultiplexing collimators C3 and C4. Accordingly, the multiplexing collimator C5 is arranged between the demultiplexing collimators C3 and C4 when viewed from the rear. Additionally, the multiplexing collimator C5 has the opening end on the front and is disposed in a plane identical to all the demultiplexing collimators C1 to C4.

Figure 7A:
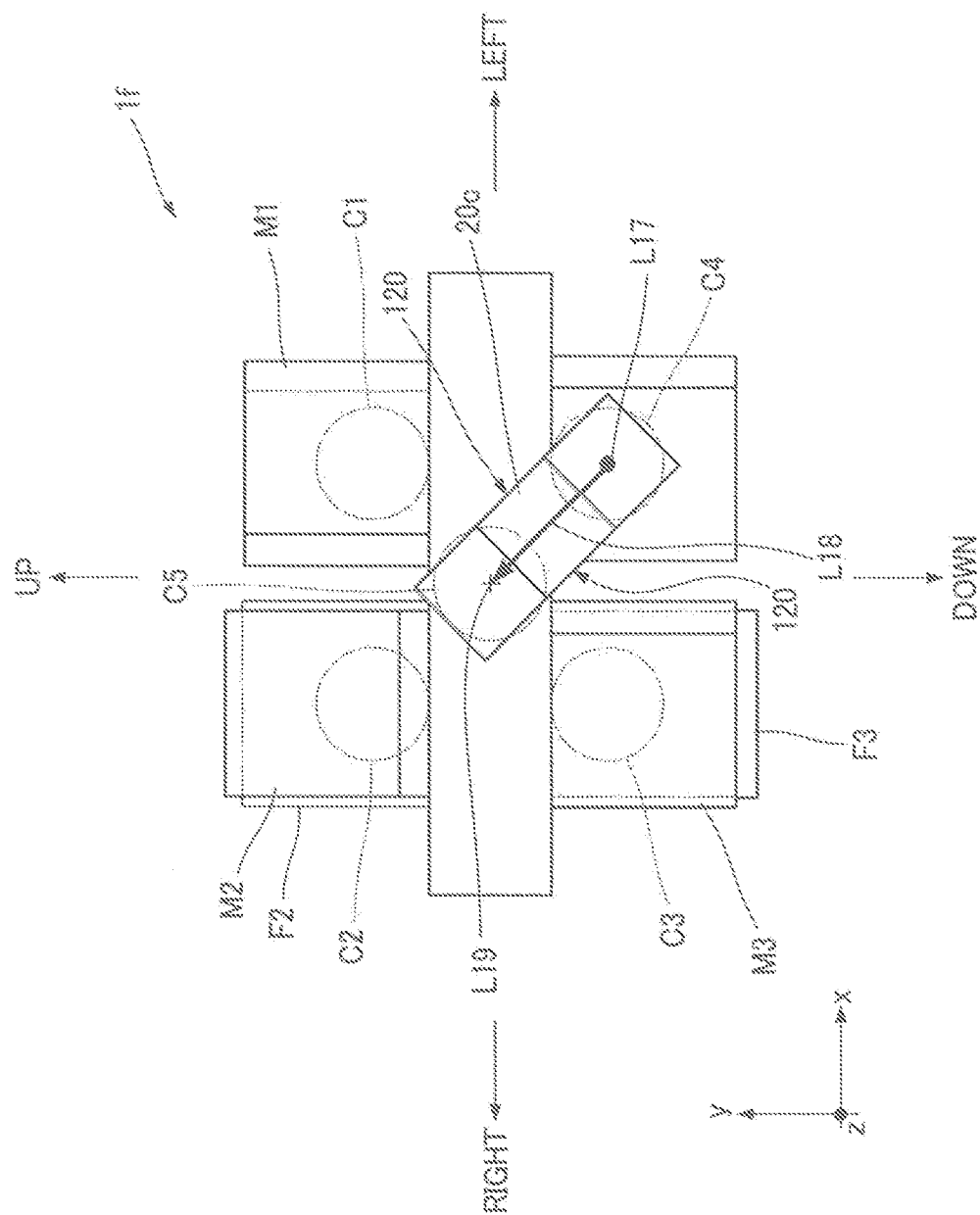
FIG. 7A is a drawing illustrating an optical multiplexer/demultiplexer according to a first modification of the fourth embodiment of this disclosure.
Figure 7B:
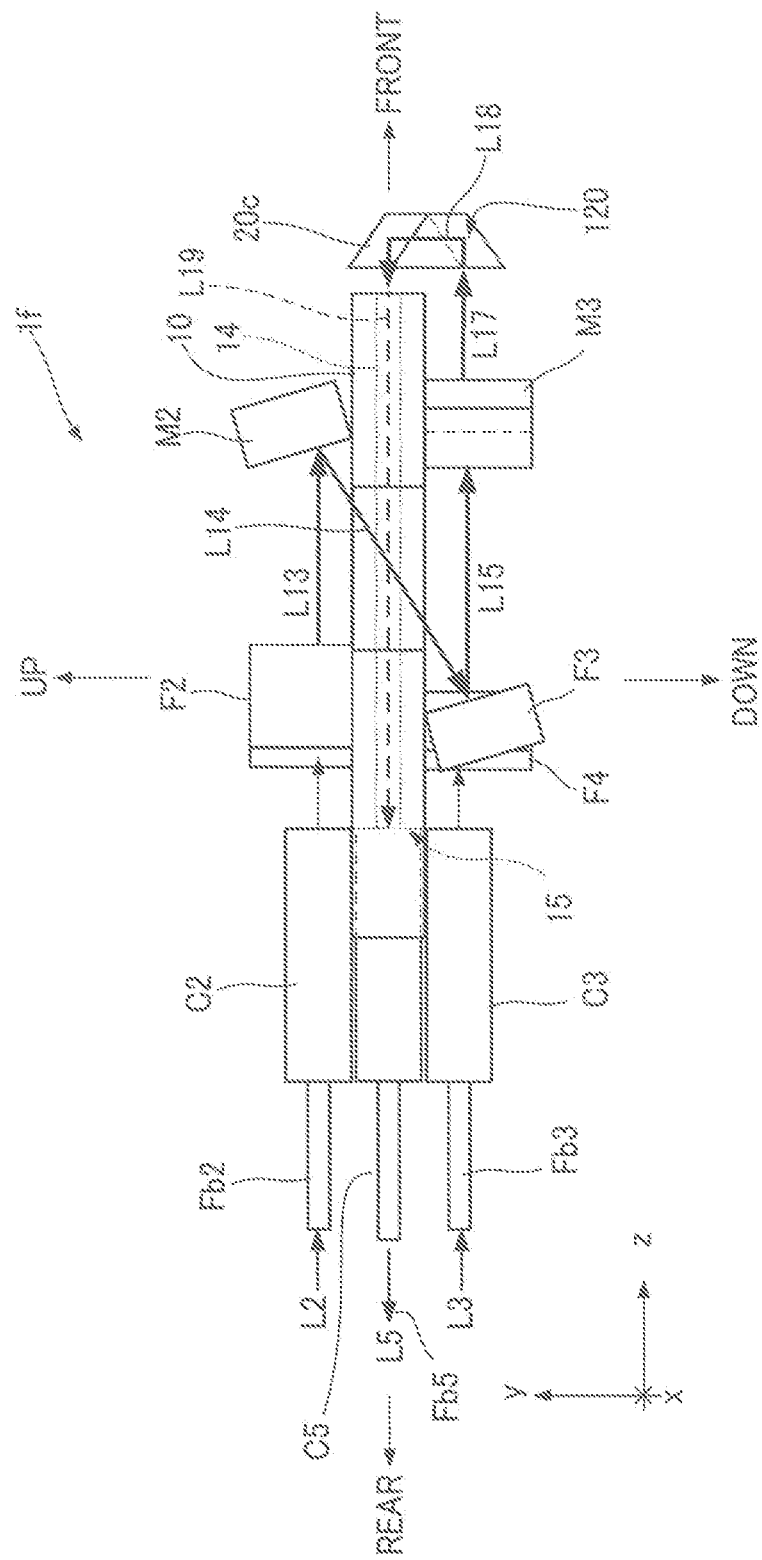
FIG. 7B is a drawing illustrating the optical multiplexer/demultiplexer according to the first modification of the fourth embodiment of this disclosure.

Changing the arrangement of the optical path deflecting portion (20a, 20b) in the optical multiplexer/demultiplexer (1d, 1e) according to the fourth embodiment illustrated in FIG. 6A and FIG. 6B allows disposing the multiplexing collimator C5 at the center of the rectangular region formed of the demultiplexing collimators C1 to C4 when viewed from the rear. FIG. 7A and FIG. 7B illustrate a first modification of the fourth embodiment, which is an optical multiplexer/demultiplexer 1f including the multiplexing collimator C5 located at the center of the rectangular region formed of the demultiplexing collimators C1 to C4. FIG. 7A and FIG. 7B illustrate the optical multiplexer/demultiplexer 1f according to the first modification operating as the optical multiplexer. FIG. 7A is a front view of the optical multiplexer/demultiplexer 1f according to the first modification. FIG. 7B is a side view of the optical multiplexer/demultiplexer 1f when viewed from right. The optical multiplexer/demultiplexer 1f illustrated here includes the multiplexing collimator C5 which has an opening end on the front end and which is located at the rear of the substrate 10. The opening end of the multiplexing collimator C5 is on the plane identical to the opening ends of the demultiplexing collimators C1 to C4 and further is disposed at the center of the arrangement regions of the demultiplexing collimators C1 to C4. Similar to the optical multiplexer/demultiplexer 1e according to the fourth embodiment described above in FIG. 6B, an optical path deflecting portion 20c of the optical multiplexer/demultiplexer 1f is constituted of the right-angled prism or the isosceles trapezoid prism. However, as illustrated in FIG. 7A, on the optical path deflecting portion 20c, a side surface 120 of the prism (a triangular shape, an isosceles trapezoid, or the like) is inclined by 45° with respect to the z-x plane about the z-axis. When viewed along the front-rear direction, the surface of the optical path deflecting portion 20c for entering/emitting the light is disposed across an area from the opening end of the demultiplexing collimator C4 to the center position in the right-left direction on the front end surface of the substrate 10.

When the light L17 traveling from the interference film filter F4 to the multiplexing collimator C5 enters the rear surface, the optical path deflecting portion 20c operates such that the light bends upward rightward and turns back backward. Accordingly, the optical path of the light L18 that enters/is emitted from the optical path deflecting portion 20c travels from the demultiplexing collimator C4 toward the center position in the right-left direction of the substrate 10 when viewed along the front-rear direction. That is, the position in the right-left direction for emitting the light L18 becomes the center of the arrangement regions of the four demultiplexing collimators C1 to C4.

Since the substrate 10 is interposed on the optical path of the light L18 emitted by the optical path deflecting portion 20c, as illustrated in FIG. 7B, this example forms a hole 14 penetrating the substrate 10 in the front-rear direction. Needless to say, a structure in which the substrate 10 is laterally divided may be employed. In any cases, the passage 14 is disposed which communicates the substrate 10 in the front-rear direction so that the light passes through it. Accordingly, the light L18 has emitted by the optical path deflecting portion 20c, and as a light L19, passes through this passage 14 and travels toward the rear end of the substrate 10. In the optical multiplexer 1f according to the first modification of the fourth embodiment illustrated in FIG. 7B, a cutout portion 15 is formed at the rear of the substrate 10 such that the opening end of the multiplexing collimator C5 is disposed on the plane identical to the opening ends of the demultiplexing collimators C1 to C4. In the optical multiplexer 1f according to the first modification with the above-described configuration, the multiplexing collimator C5 is disposed on the rear end side and disposed at the center of the arrangement regions of the demultiplexing collimators C1 to C4 when viewed along the front-rear direction. With the optical multiplexers/demultiplexers (1d to 1f) according to the fourth embodiment thus including the optical path deflecting portions (20a to 20c), the position of the multiplexing collimator C5 can be freely configured.

Figure 8B:
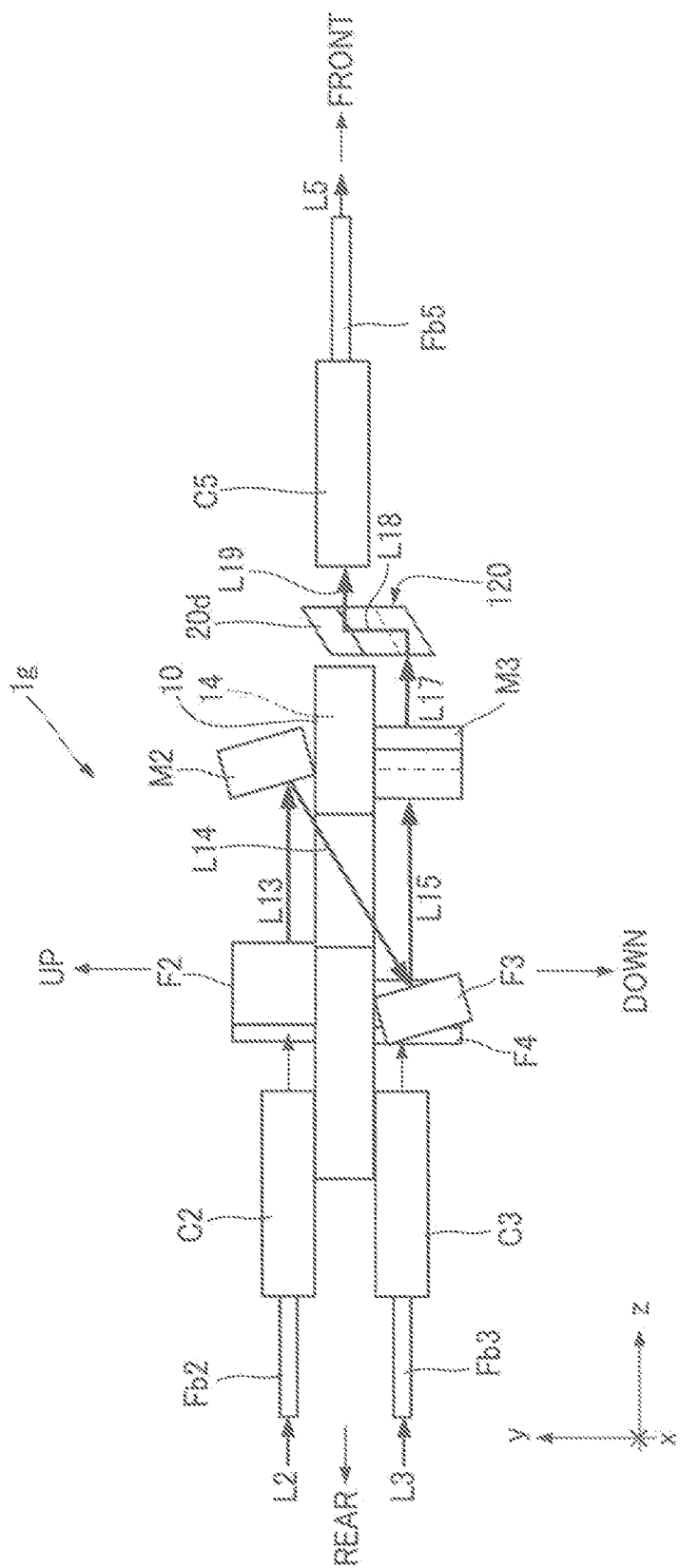
FIG. 8B is a drawing illustrating the optical multiplexer/demultiplexer according to the second modification of the fourth embodiment of this disclosure.

As another modification of the optical multiplexer/demultiplexer (1d, 1e) according to the fourth embodiment, there is an optical multiplexer/demultiplexer 1g according to a second modification of the fourth embodiment illustrated in FIG. 8A and FIG. 8B. FIG. 8A and FIG. 8B are drawings illustrating the optical multiplexer/demultiplexer 1g that operates as the optical multiplexer. FIG. 8A is a front view of the optical multiplexer/demultiplexer 1g when viewed from front. FIG. 8B is a side view of the optical multiplexer/demultiplexer 1g when viewed from right. In the optical multiplexer/demultiplexer 1g, the optical path deflecting portion 20c in the optical multiplexer/demultiplexer 1f according to the first modification illustrated in FIG. 7B is replaced with an optical path deflecting portion 20d using a diamond prism. The multiplexing collimator C5 is disposed at the center of the arrangement regions of the demultiplexing collimators C1 to C4 viewed from the front-rear direction, and this multiplexing collimator C5 is disposed on the front end side.

Figure 9A:
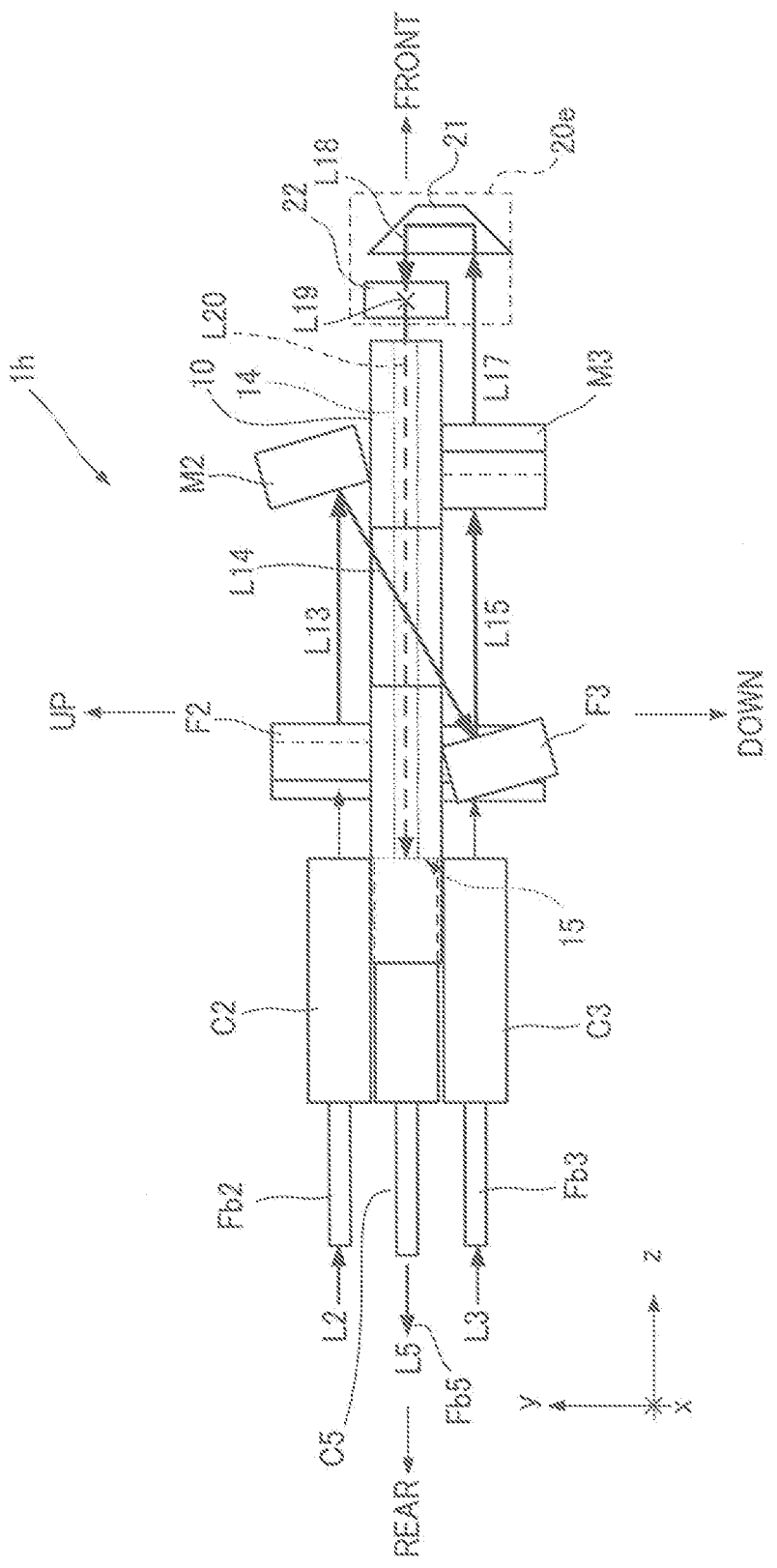
FIG. 9A is a drawing illustrating an optical multiplexer/demultiplexer according to a third modification of the fourth embodiment of this disclosure.
Figure 9B:
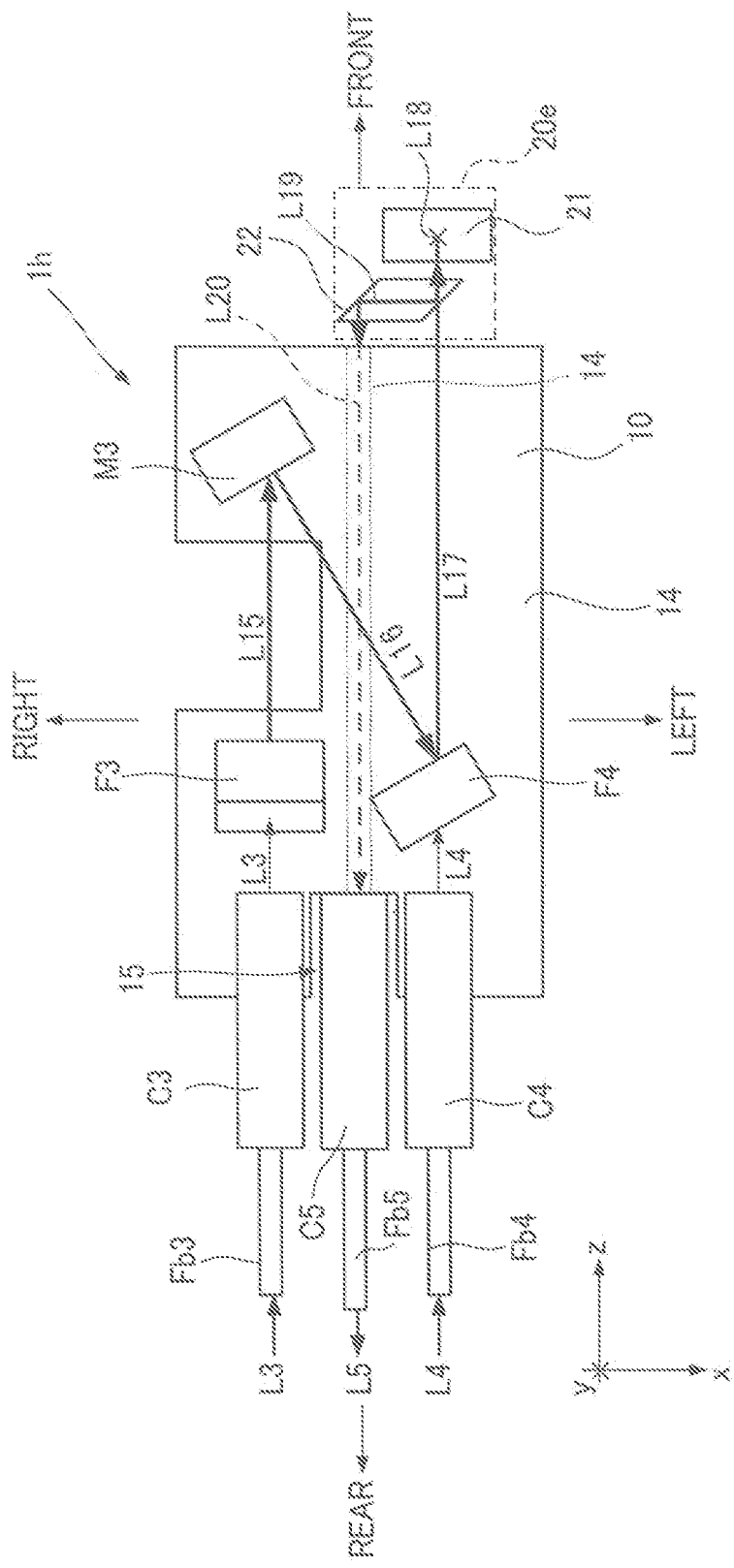
FIG. 9B is a drawing illustrating the optical multiplexer/demultiplexer according to the third modification of the fourth embodiment of this disclosure.

Combining the configurations of the optical path deflecting portions (20a, 20b) in the optical multiplexers/demultiplexers (1d, 1e) according to the fourth embodiment illustrated in FIG. 6A and FIG. 6B can also realize an optical multiplexer/demultiplexer which operates similar to the optical multiplexer/demultiplexer 1f according to the first modification illustrated in FIG. 7A and FIG. 7B and the optical multiplexer/demultiplexer 1g according to the second modification illustrated in FIG. 8A and FIG. 8B. FIG. 9A and FIG. 9B are drawings illustrating an optical multiplexer/demultiplexer 1h according to a third modification of the fourth embodiment. The optical multiplexer/demultiplexer 1h according to the third modification illustrated in FIG. 9A and FIG. 9B performs operations identical to the optical multiplexer/demultiplexer 1f according to the first modification illustrated in FIG. 7A and FIG. 7B. FIG. 9A and FIG. 9B illustrate the optical multiplexer/demultiplexer 1h according to the third modification operating as the optical multiplexer. FIG. 9A is a side view of the optical multiplexer/demultiplexer 1h according to the third modification when viewed from right. FIG. 9B is a plan view of the optical multiplexer/demultiplexer 1h according to the third modification when viewed from below. The optical multiplexer/demultiplexer 1h according to the third modification illustrated FIG. 9A and FIG. 9B includes the multiplexing collimator C5 which has the opening end on the front end and which is located at the rear of the substrate 10. The opening end of the multiplexing collimator C5 is on the plane identical to the opening ends of the demultiplexing collimators C1 to C4, and is disposed at the center of the arrangement regions of the demultiplexing collimators C1 to C4. An optical path deflecting portion 20e of the optical multiplexer/demultiplexer 1h includes: a first optical path deflecting portion 21 constituted of the right-angled prism or the isosceles trapezoid prism; and a second optical path deflecting portion 22 constituted of the diamond prism.

As the operation of the optical path deflecting portion 20e, first, the first optical path deflecting portion 21 bends upward the light L17 traveling from the interference film filter F4 to the multiplexing collimator C5. And the light L17 turns back backward. Accordingly, the optical path of the light L18 that enters/is emitted from the first optical path deflecting portion 21 is bent in a square U-shape when viewed from the right-left direction. The position where this light L18 is emitted is the intermediate position between the demultiplexing collimators C2 and C3. When the light L18 which has turned back backward by the first optical path deflecting portion 21 enters the second optical path deflecting portion 22, the second optical path deflecting portion 22 shifts rightward the entered light L18 and emits the light L18 backward. The optical path of the light L19 that enters/is emitted from the second optical path deflecting portion 22 is bent into the crank shape when viewed along the up-down direction. The position in the right-left direction where the light L19 is emitted is the intermediate position between the demultiplexing collimators C3 and C4. Accordingly, the position where the light L19 is emitted from the second optical path deflecting portion 22 becomes the center of the arrangement regions of the four demultiplexing collimators C1 to C4 when viewed along the front-rear direction. As illustrated in FIG. 9A, this optical multiplexer/demultiplexer 1h also includes the passage 14 which communicates the substrate 10 in the front-rear direction so that the light passes through it. In this third modification, for example, if the second optical path deflecting portion 22 is a right-angled prism or an isosceles trapezoid prism, the light L18 which has turned back rearward by the first optical path deflecting portion 21 can turn back forward again. Thus, the optical multiplexer/demultiplexer operating similar to the optical multiplexer/demultiplexer 1g according to the second modification of the fourth embodiment illustrated in FIG. 8A and FIG. 8B can be configured.

The optical multiplexers/demultiplexers (1d to 1h) according to the fourth embodiment thus include the optical path deflecting portions (20a to 20e), and this makes it possible to set freely the position of the multiplexing collimator C5. The bent optical paths are formed using the prisms in the following embodiments: the optical path deflecting portion 20a in the optical multiplexer/demultiplexer 1d according to the fourth embodiment illustrated in FIG. 6A; the optical path deflecting portion 20b in the optical multiplexer/demultiplexer 1e according to the fourth embodiment illustrated in FIG. 6B; the optical path deflecting portion 20c in the optical multiplexer/demultiplexer 1f according to the first modification of the fourth embodiment illustrated in FIG. 7A and FIG. 7B; the optical path deflecting portion 20d in the optical multiplexer/demultiplexer 1g according to the second modification of the fourth embodiment illustrated in FIG. 8A and FIG. 8B; and the optical path deflecting portion 20e in the optical multiplexer/demultiplexer 1h according to the third modification of the fourth embodiment illustrated in FIG. 9A and FIG. 9B. However, the surface where the optical path is bent in the prism may be constituted of a mirror.

Fifth Embodiment

In the optical multiplexer/demultiplexer using the interference film filter, it is necessary to decrease the optical loss as much as possible by accurately guiding the input light to the positions of the opening ends of the demultiplexing collimators and the multiplexing collimator. That is, high alignment accuracy of the optical axes is required. To enhance the alignment accuracy, it is necessary to fix the interference film filters and mirrors with high positioning accuracy. Especially, the optical multiplexer/demultiplexer 1b according to the second embodiment has the configuration which reflects the shift of the optical paths in the interference film filters F1 to F4, and the higher alignment accuracy is required. Therefore, the optical multiplexer/demultiplexer according to the fifth embodiment has a configuration and a structure in which the alignment accuracy of the optical axes is improved and in which optical-axis alignment work is facilitated.

Figure 10A:
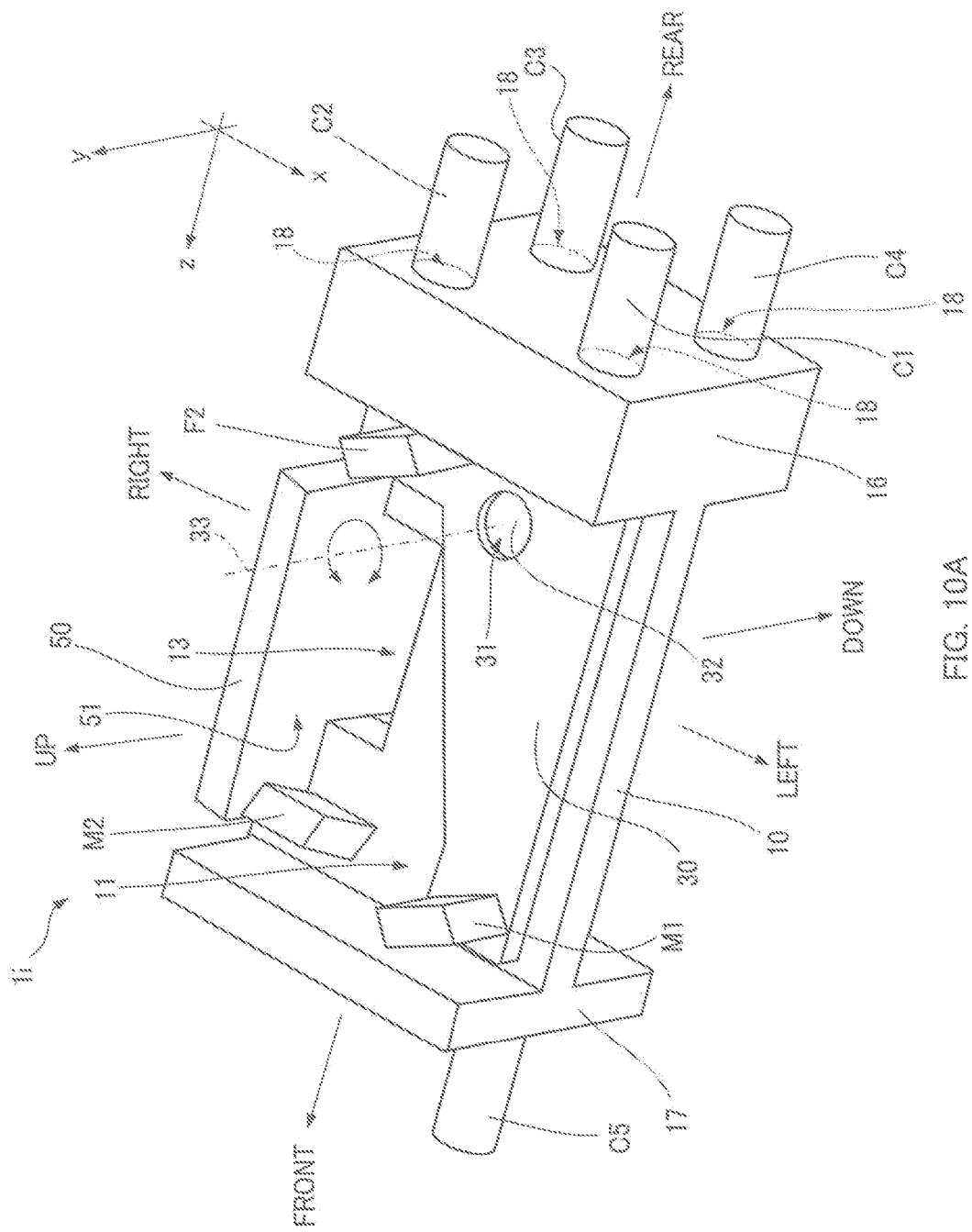
FIG. 10A is a drawing illustrating an optical multiplexer/demultiplexer according to a fifth embodiment of this disclosure.
Figure 10B:
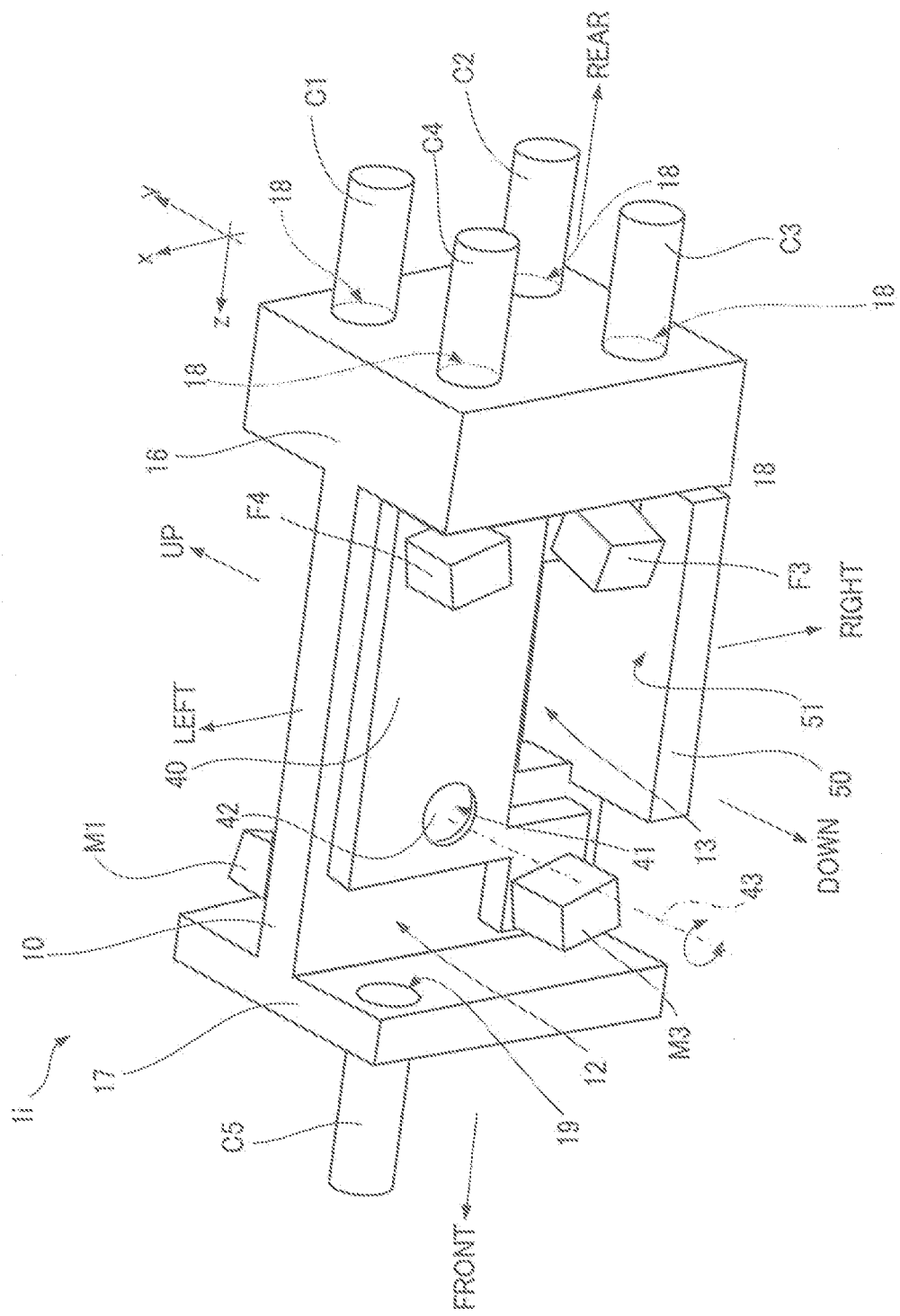
FIG. 10B is a drawing illustrating an optical multiplexer/demultiplexer according to a modification of the fifth embodiment of this disclosure.

FIG. 10A and FIG. 10B illustrate an optical multiplexer/demultiplexer 1i according to the fifth embodiment of this disclosure. FIG. 10A illustrates a perspective view of the optical multiplexer/demultiplexer 1i according to the fifth embodiment when viewed from above rear left. FIG. 10B illustrates a perspective view of the optical multiplexer/demultiplexer 1i when viewed from below rear left. An optical system of the optical multiplexer/demultiplexer 1i according to the fifth embodiment is similar to the optical multiplexer/demultiplexer 1b according to the second embodiment illustrated in FIG. 4A, FIG. 4B, and FIG. 4C.

As illustrated in FIG. 10A and FIG. 10B, the substrate 10 has an H shape when viewed along the right-left direction, and is composed of a part which is formed as a unit and in which a flat plate has front and rear plates parallel to the x-y plane on both front and rear ends. The front and the rear plates of the H-shaped substrate 10 are collimator holders (16 and 17) to hold the demultiplexing collimators C1 to C4 and the multiplexing collimator C5. The collimator holder 16 at the rear has four holes 18 penetrating in the front-rear direction so that the holes are equally spaced in the right-left direction and in the up-down direction. Through these holes 18, the front end parts of the demultiplexing collimators C1 to C4 are inserted. As illustrated in FIG. 10B, the collimator holder 17 at the front has one hole 19 penetrating in the front-rear direction. Through the hole 19, the rear end part of the multiplexing collimator C5 is inserted. The demultiplexing collimators C1 to C4 and the multiplexing collimator C5 are fixed to the collimator holders (16, 17) by welding, adhesion, or a similar method.

As illustrated in FIG. 10A, in the optical system of the optical multiplexer/demultiplexer 1i according to the fifth embodiment, the mirror M1 and the interference film filter F2 face each other, and the optical path between them is tilted about the y-axis with respect to the z-axis direction. With maintaining facing each other, these mirror M1 and interference film filter F2 are fixed on an upper surface of an auxiliary substrate 30 different from the substrate 10. The auxiliary substrate 30 is placed on the upper surface 11 of the substrate 10. The auxiliary substrate 30 has a hole 31 penetrating in the up-down direction formed thereon. A flat column-shaped protrusion 32 engaging with this hole 31 is formed on the upper surface 11 of the substrate 10. A center axis 33 of the protrusion 32 is parallel to the y-axis. For the alignment of optical axes, the auxiliary substrate 30 is rotated around the center axis 33. After finishing the alignment of the optical axes, the auxiliary substrate 30 is fixed to the substrate 10 by methods such as welding and adhesion. Consequently, the reflecting surface on the mirror M1 and the surface for entering/emitting the light of the interference film filter F2 are fixed with facing each other, the x-y planes being tilted by a predetermined angle around the y-axis.

As illustrated in FIG. 10B, in the similar manner to the foregoing, the mirror M3 and the interference film filter F4 are disposed on the lower surface 12 of the substrate 10. The mirror M3 and the interference film filter F4 face each other, and the x-y planes of them are inclined by the predetermined angle about the y-axis. This mirror M3 and the interference film filter F4 are fixed on a lower surface of an auxiliary substrate 40 placed on the lower surface 12 of the substrate 10. The auxiliary substrate 40 also has a hole 41 penetrating in the up-down direction formed on. A flat column-shaped protrusion 42 engaging with this hole 41 is formed on the lower surface 12 of the substrate 10. Similar to the auxiliary substrate 30 on the upper surface 11 of the substrate 10, the auxiliary substrate 40 is rotatable with respect to the substrate 10 around an axis 43 of the protrusion 42 for the alignment of optical axes. After the alignment of the optical axes, the auxiliary substrate 40 adjusted at a predetermined rotation position is fixed to the substrate 10.

The optical multiplexer/demultiplexer 1i includes a fixing plate 50 having the y-z plane, and the fixing plate 50 extends from the front side of the upper surface 11 to the rear side of the lower surface 12 of the substrate 10. The right surfaces of the mirror M2 and of the interference film filter F3 adhere to the left surface of the fixing plate 50. Thus, the mirror M2 and the interference film filter F3 are fixed being inclined by the predetermined angle around the x-axis. In this example, the fixing plate 50 is composed of flat plates as a unit, in which the upper end plate and the lower end plate are connected through the cutout portion 13. The region of connecting the upper endplate and the lower endplate is fitted to the right side of the cutout portion 13.

Sixth Embodiment

In the optical multiplexer/demultiplexer 1i according to the foregoing fifth embodiment illustrated in FIG. 10A and FIG. 10B, welding and adhesion are available as a method for fixing to the collimator holders (16, 17) the demultiplexing collimators C1 to C4 and the multiplexing collimator C5. In a case of adhesion, high strength and high heat resistance are not needed for the materials of the holders of the collimators C1 to C5 and the collimator supporting body, and therefore adhesion is advantageous in that a material other than a metal, such as a resin, is applicable. Adhesion is also advantageous in that the alignment for optical axes can be easily performed while the collimators C1 to C5 are held due to the viscosity of unhardened adhesive.

However, in cases of adhesion, which includes a case of using a photocurable adhesive, any of the following methods are employed: adhesive is applied to the inside of the holes (18, 19) and then inserts the collimators C1 to C5 into the holes (18, 19); or adhesive is injected from clearances between the holes (18, 19) and the collimators C1 to C5 while the collimators C1 to C5 are inserted into the holes (18, 19). In the case where the adhesive is applied to the inside of the holes (18, 19) in advance, there is a possibility that optical properties of an optical device deteriorates (18, 19) because the adhesive sticks to the opening ends of the collimators C1 to C5 in a process of inserting the collimators C1 to C5 into holes.

In the case where adhesive is injected after the collimators C1 to C5 are inserted into the holes (18, 19), there is a possibility that the adhesive strength is insufficient because the amount of the applied adhesive is insufficient at deep portions of the holes (18, 19). The use of the large amount of adhesive results in a leakage of the extra adhesive from the opening of the hole (18, 19), and thus there is a possibility of contaminating the opening ends of the collimators C1 to C5 with the adhesive. In a case of using the photocurable adhesive as the adhesive, for sufficient hardening of the adhesive, it is necessary to surely expose the deep portions of the holes (18, 19) to light (e.g. ultraviolet rays), that is to surely expose to the light the entire region where the photocurable adhesive has been applied. Insufficient exposure results in remaining of an unhardened part. Consequently, the optical axes of the collimators C1 to C5 are displaced due to vibration or the like, and properties of the optical multiplexer/demultiplexer 1*i* become unstable. Accordingly, separately from the holes (18, 19) through which the collimators C1 to C5 are inserted, a hole from which the adhesive is injected or through which the photocurable adhesive is exposed to light may be formed on the collimator holders (16, 17).

Figure 11A:
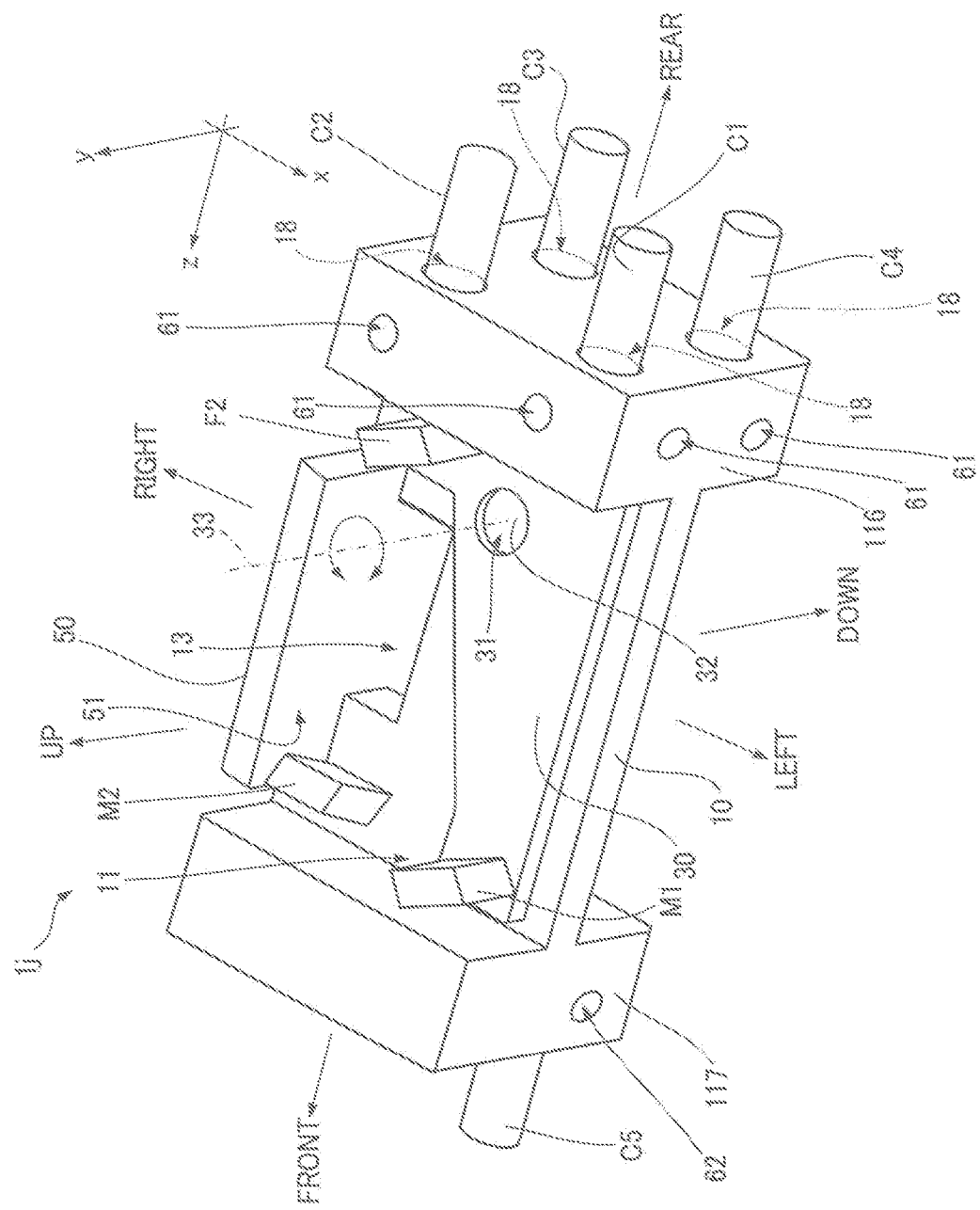
FIG. 11A is a drawing illustrating an optical multiplexer/demultiplexer according to a sixth embodiment of this disclosure.
Figure 11B:
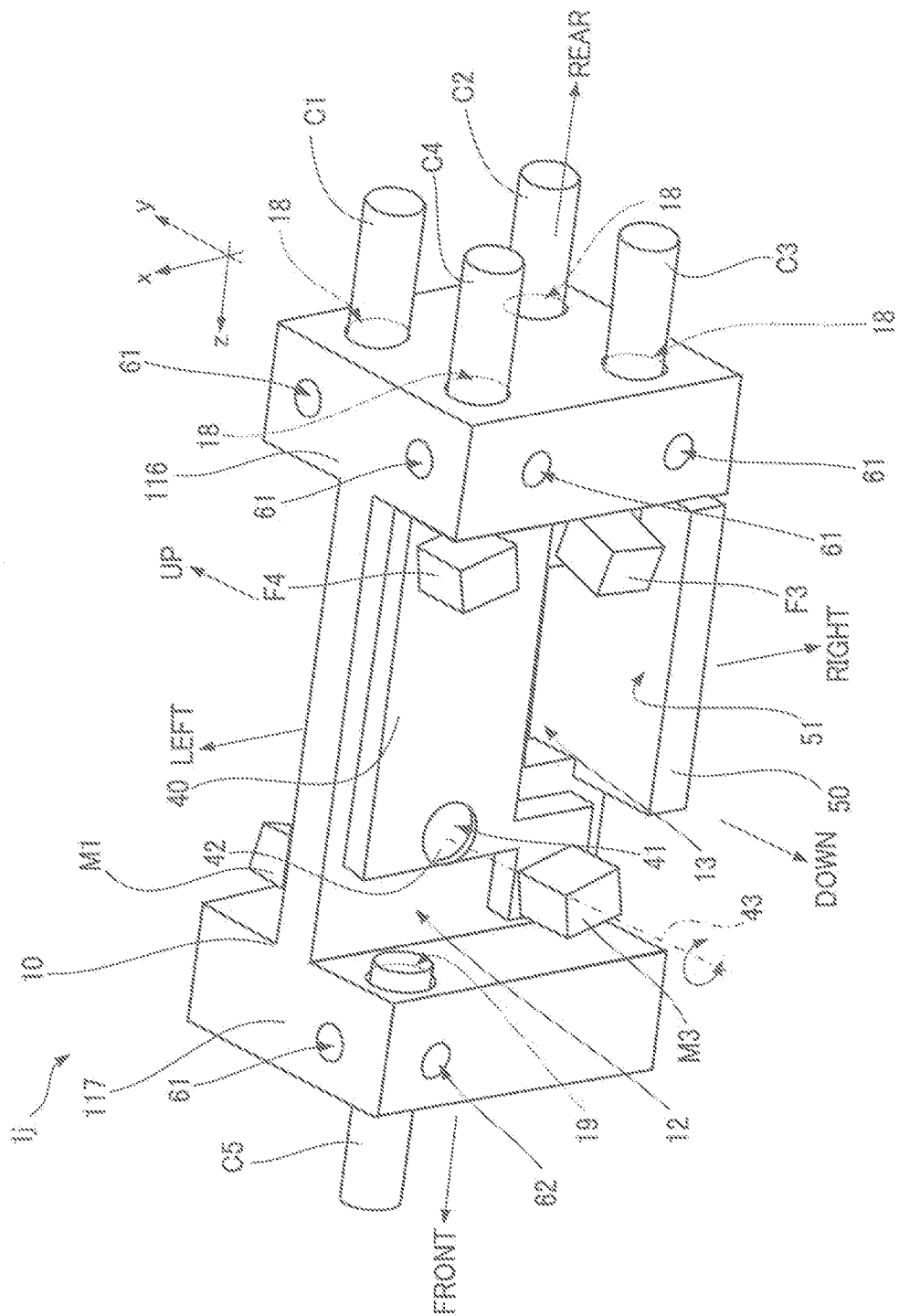
FIG. 11B is a drawing illustrating the optical multiplexer/demultiplexer according to the sixth embodiment of this disclosure.

Therefore, as the optical multiplexer/demultiplexer according to the sixth embodiment, the following describes an optical multiplexer/demultiplexer that has a hole from which the adhesive is injected and the light is irradiated to the photocurable adhesive at the collimator holder. FIG. 11A and FIG. 11B illustrate an optical multiplexer/demultiplexer 1*j* according to the sixth embodiment. FIG. 11A illustrates a perspective view of the optical multiplexer/demultiplexer 1*j* according to the sixth embodiment when viewed from above rear left. FIG. 11B illustrates a perspective view of the optical multiplexer/demultiplexer 1*j* according to the sixth embodiment when viewed from below rear left. An optical system of the optical multiplexer/demultiplexer 1*j* according to the sixth embodiment is similar to the optical multiplexer/demultiplexer 1*b* according to the second embodiment illustrated in FIG. 4A, FIG. 4B, and FIG. 4C.

In collimator holders (116, 117) included in the optical multiplexer/demultiplexer 1*j* according to the sixth embodiment, holes (18, 19) through which the collimators C1 to C5 are inserted are included, and also communication holes (61, 62) serving as paths for exposing the adhesive to light are included.

For example, as for a procedure for mounting and fixing the collimators C1 to C5 to the collimator holders with the photocurable adhesive, the photocurable adhesive is first applied to the inner surfaces of the holes (18, 19). In this case, the adhesive can be supplied to the inside of the holes (18, 19) through the communication holes (61, 62). As necessary, the adhesive may be injected through the openings of the holes (18, 19). Next, the collimators C1 to C5 are supported to the inner surfaces of the holes (18, 19).

When the collimators C1 to C5 are inserted into the holes (18, 19) and the adhesive is applied, the alignment for the optical axes is performed by adjusting the positions of the collimators C1 to C5 with respect to the holes (18, 19). Alternatively, the alignment for the optical axes is performed concurrently with the work in which the collimators C1 to C5 is inserted into the holes (18, 19) and in which the adhesive is injected through the communication holes (61, 62). After the alignment for the optical axes is completed, the inside of the holes (18, 19) is exposed to the ultraviolet rays through the openings of the holes (18, 19) and through the communication holes (61, 62), thus hardening the adhesive.

Figure 12:
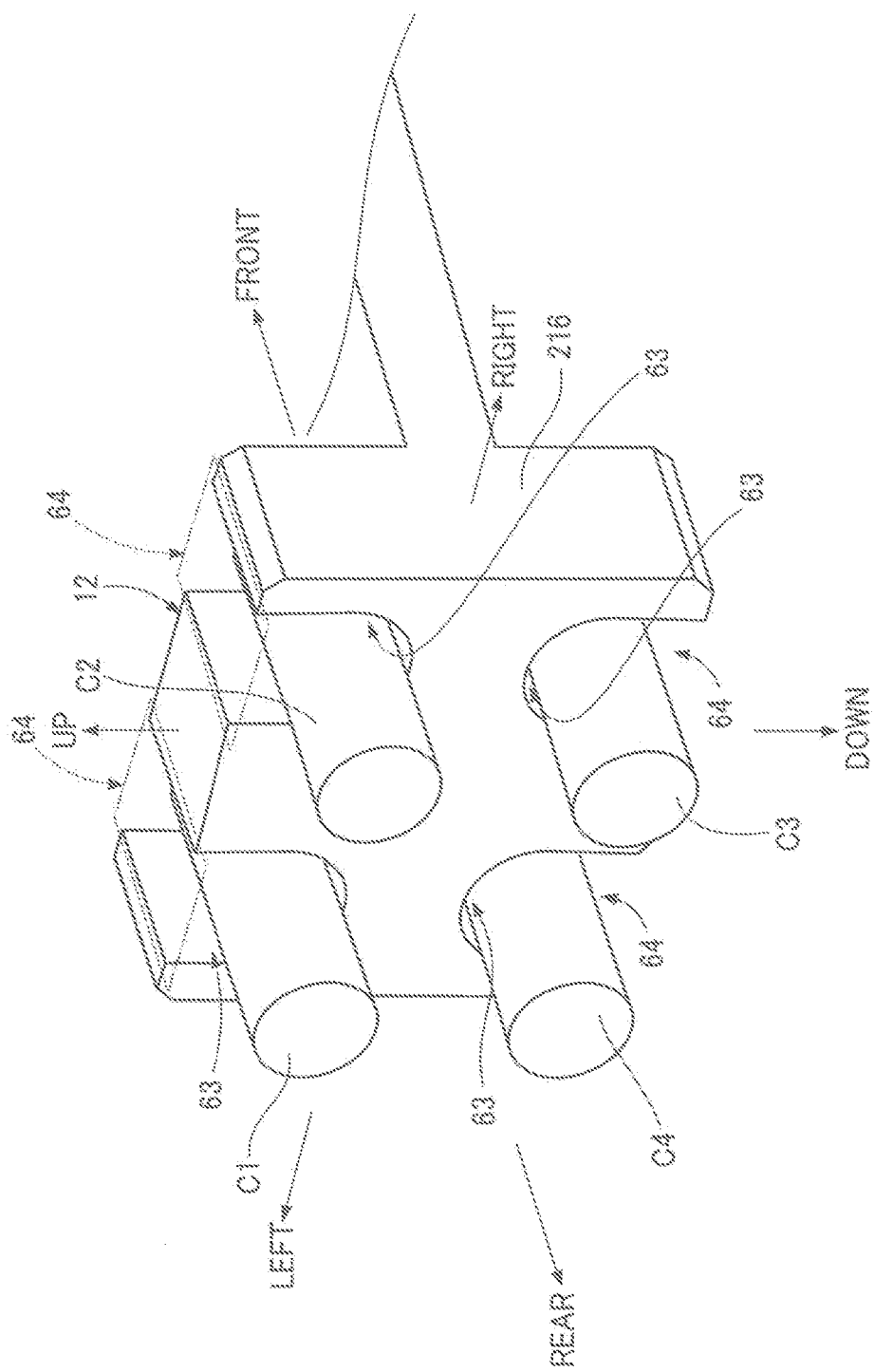
FIG. 12 is a drawing illustrating an optical multiplexer/demultiplexer according to a first modification of the sixth embodiment of this disclosure.

The path for injecting the adhesive and the path for exposing the photocurable adhesive to light are not limited to the communication holes (61, 62). In addition, the structure to support the collimators (C1 to C5) is not limited to the holes (18, 19) formed at the collimator holders (116, 117). The following configuration is sufficient: the collimator holder includes a guide part and an opening; the guide part is formed extending in the front-rear direction and having open ends on both front and rear end surfaces (e.g. the holes (18, 19) and a U-shaped groove); the opening communicates between the inner surface and the outside of the guide part (e.g. a communication hole and a slit of a groove); and the cross-sectional shape of the guide part matches the cross-sectional shape of the collimator. FIG. 12 is a drawing illustrating the optical multiplexer/demultiplexer according to a first modification of the sixth embodiment. FIG. 12 illustrates a collimator holder 216 on the rear side of the optical multiplexer/demultiplexer according to the first modification. As illustrated in FIG. 12, U-shaped grooves 63 may be disposed at the collimator holder 216 to hold the collimators (C1 to C4) along these U-shaped grooves 63.

Accordingly, slits 64, which are formed extending in the front-rear direction and each of which has the same width of the U-shaped groove 63, become paths for injecting the adhesive and paths for exposing the photocurable adhesive to light. The cross-sectional shape and the formation positions of the U-shaped grooves are not limited to the example illustrated in FIG. 12. For example, the cross-sectional shape of the U-shaped grooves may be a semicircular shape, and the U-shaped grooves may be formed on the corners of the collimator holder 216.

Figure 13:
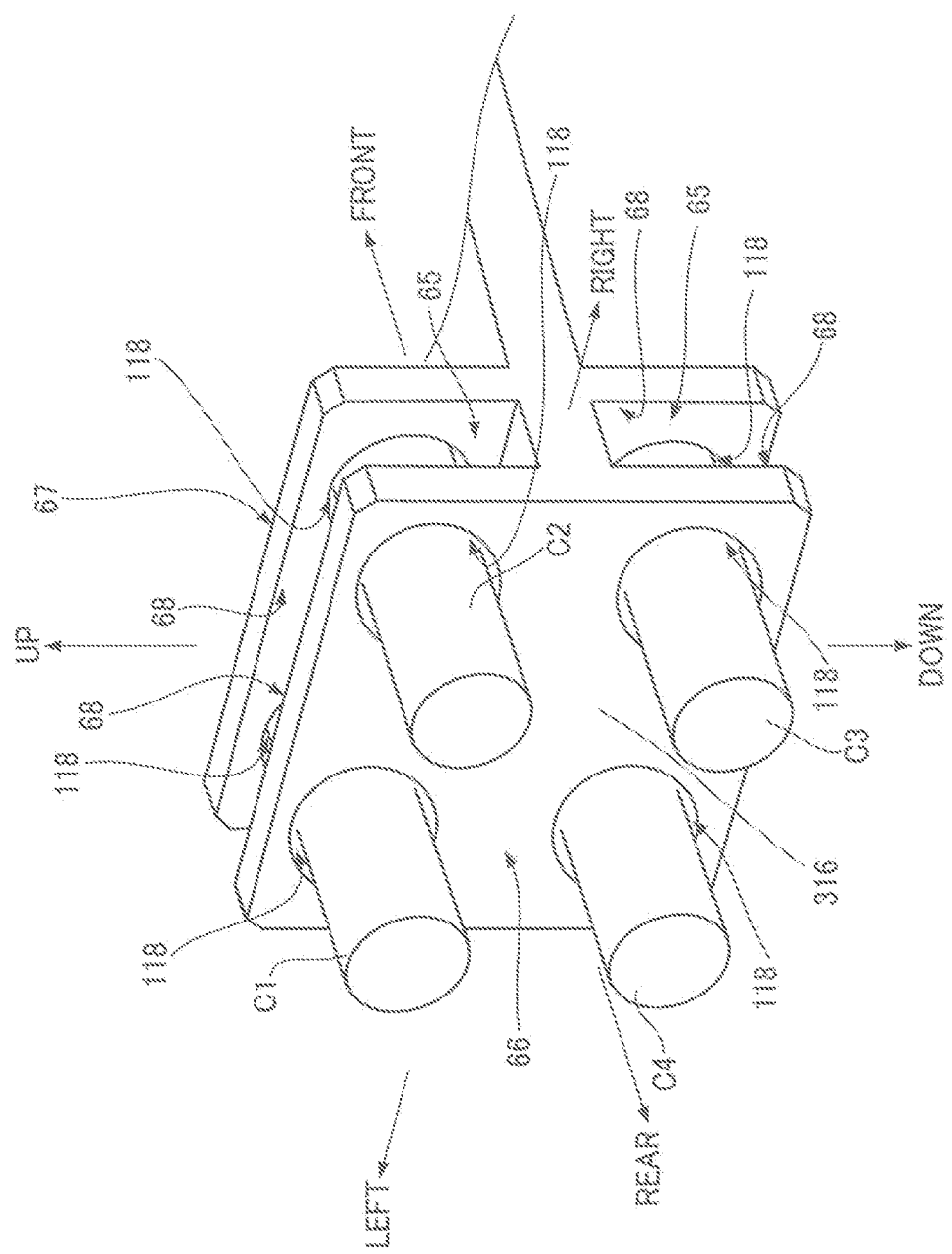
FIG. 13 is a drawing illustrating an optical multiplexer/demultiplexer according to a second modification of the sixth embodiment of this disclosure.

FIG. 13 is a drawing illustrating an optical multiplexer/demultiplexer according to a second modification of the sixth embodiment. FIG. 13 illustrates a collimator holder 316 on the rear side of the optical multiplexer/demultiplexer according to the second modification. As illustrated in FIG. 13, the collimator holder 316 includes holes 118 through which the collimators (C1 to C4) are inserted. The collimator holder 316 also has a groove 65 to divide the holes 118 in the front-rear direction. Thus, the holes 118 are each divided into two: the front part and the rear part. And, the collimator holder 316 has a structure in which the thin flat plates face each other in the front-rear direction via the groove 65. Therefore, the actual length of the holes 118 in the front-rear direction is short, ensuring reducing an amount of the adhesive used.

Since the actual length of the holes 118 in the front-rear direction is short, the adhesive is sufficiently applied to the entire inner surfaces of the holes 118 even when the adhesive is supplied through the front and rear opening ends of the holes 118 with the collimators (C1 to C4) being inserted through the holes 118. Even when the ultraviolet rays are illuminated from a front end surface 66 and a rear end surface 67 of the collimator holder 316, a region between the front and rear opening ends of the holes (18, 19) is sufficiently exposed to the ultraviolet rays. Needless to say, the ultraviolet rays may be illuminated from the inner wall surface 68 of the groove 65. The collimators (C1 to C4) are held by the holes 118, and this makes it possible to prevent the collimators from dropping during the alignment of optical axes. Also, this makes it possible to reduce deterioration with time of the optical properties due to an external force such as vibrations.

Other Embodiments

Figure 14:
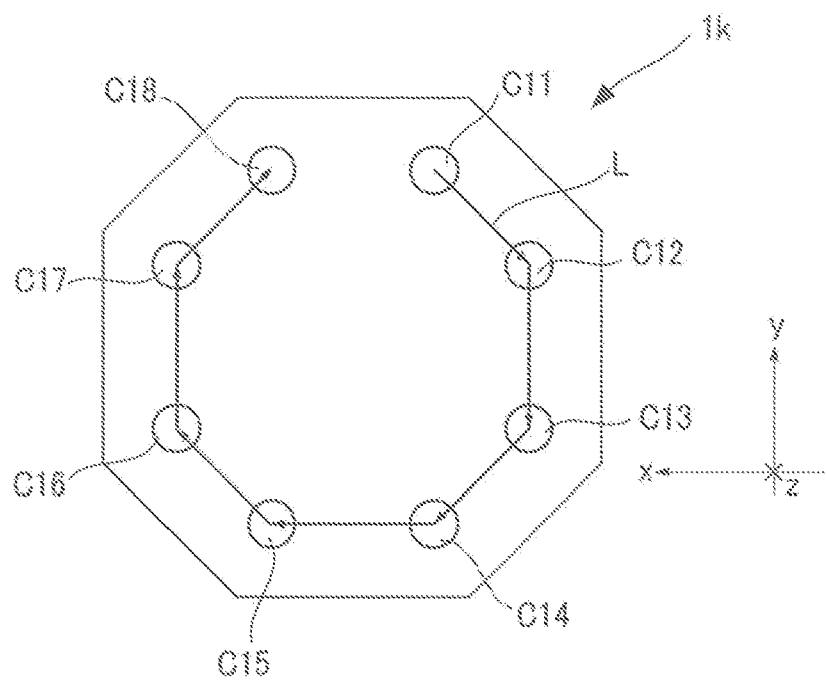
FIG. 14 is a drawing illustrating an optical multiplexer/demultiplexer according to another embodiment of this disclosure.

In the optical multiplexers/demultiplexers according to the first to the sixth embodiments of this disclosure and their modifications, the optical multiplexers/demultiplexers that multiplex and demultiplex the four kinds of different monochromatic lights are described as the examples. The configurations of the optical multiplexers/demultiplexers according to the first to sixth embodiments and their modifications are applicable to an optical multiplexer/demultiplexer that inputs/outputs the lights with the larger number of wavelengths. For example, like an optical multiplexer/demultiplexer 1*k* according to another embodiment illustrated in FIG. 14, a plurality of demultiplexing collimators C11 to C18 may be positioned at apexes of a polygon when viewing from rear to front. The optical multiplexer/demultiplexer 1*k* according to the other embodiment illustrated in FIG. 14 includes eight demultiplexing collimators C11 to C18 on the identical x-y plane so that the eight collimators are located at the apexes of a regular octagon. Concerning the demultiplexing collimators other than at least the demultiplexing collimator C11 among the demultiplexing collimators C11 to C18, an interference film filter (not shown) is disposed on the front end side. And, mirrors (not shown) are disposed in front of the demultiplexing collimator C11 and the interference film filters. An input light travels forward from the demultiplexing collimator C1, which serves as a starting point of the optical path, and the input light is sequentially reflected by the mirrors disposed on the optical axes of the demultiplexing collimators C11 to C18 and the interference film filters. The optical path L of the light sequentially reflected as mentioned above is along the contour of a polygon and traces over the contour in one way, when viewed from rear to front.

Figure 15:
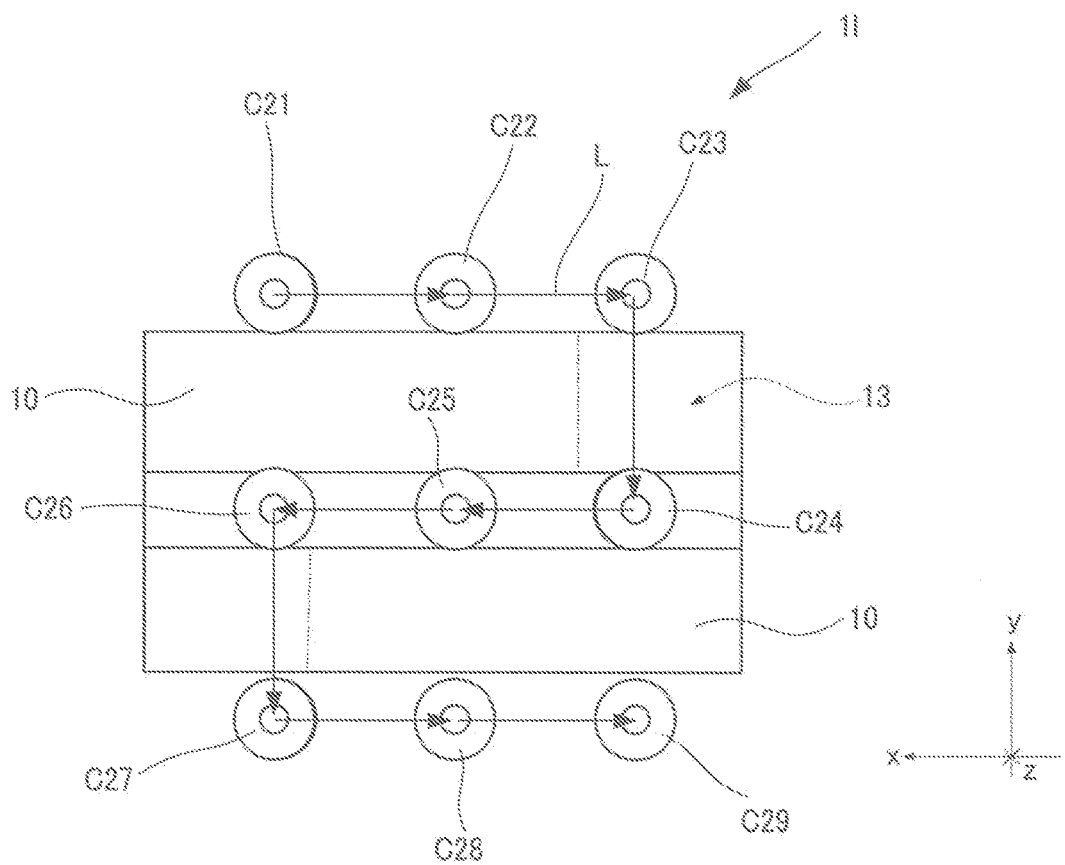
FIG. 15 is a drawing illustrating an optical multiplexer/demultiplexer according to another embodiment of this disclosure.

Alternatively, like an optical multiplexer/demultiplexer 1*l* according to another embodiment illustrated in FIG. 15, a plurality of demultiplexing collimators C21 to C29 may be arranged on three or more lines when viewed from rear to front. The optical path L of the light which has comes from the demultiplexing collimator C21 and which has been sequentially reflected between the mirrors and the interference film filters to reach the multiplexing collimator may be formed like hairpin turns when viewed from the rear. Depending on the number of demultiplexing collimators, all of the lines may not have the identical number of the demultiplexing collimators. In this case, it is sufficient that the lines other than the lowest line have the identical number of the demultiplexing collimators.

In the optical multiplexers/demultiplexers according to the embodiments, the opening ends of the optical fiber collimators serve as the optical input/output portions, the entrances and exits of the lights from outside. However, any configuration may be employed for the optical input/output portion. For example, there may be a configuration in which laser light propagating a space is directly input from and output to the optical system. Obviously, the optical fibers coupled to the demultiplexing collimators and to the multiplexing collimator may be coupled to other additional optical fibers via optical connectors or the like.

In the optical multiplexers/demultiplexers according to the embodiments, the area in which the collimators are arranged can be reduced; therefore, the application to optical transceivers of new standard, such as QSFP+ and CFP4 is possible. The embodiments include an optical transceiver that includes two optical multiplexers/demultiplexers, one operating as the optical multiplexer and the other operating as the optical demultiplexer. At least one of the two optical multiplexers/demultiplexers of the optical transceiver is the optical multiplexer/demultiplexer according to the embodiments.

Figure 16:
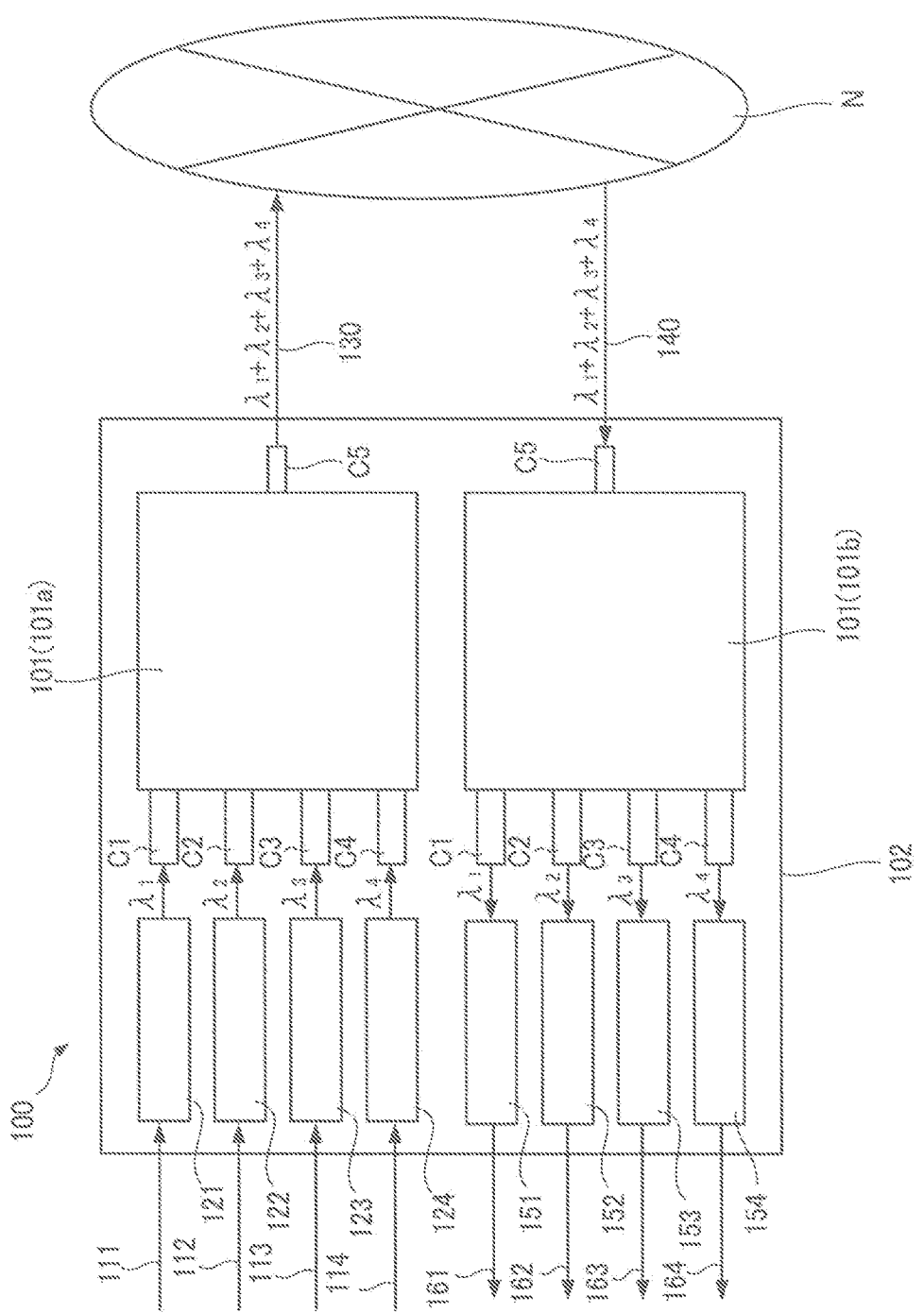
FIG. 16 is a schematic diagram illustrating a configuration of an optical transceiver according to an embodiment of this disclosure.

FIG. 16 illustrates a configuration of an optical transceiver 100 according to the embodiments of this disclosure. A configuration of the optical transceiver 100 according to the embodiments is similar to an optical transceiver of QSFP+ standard, and the schematic configuration thereof is illustrated in FIG. 16. The optical transceiver 100 according to the embodiments is installed at a data center including a large number of server devices or at a similar site. The optical transceiver 100 has the following functions: as a data transmission device, to output data from a server to an optical communications network N; and as a data reception device, to receive the optical signal transmitted from the optical communications network N and to output the optical signal to the server.

The optical transceiver 100 according to the embodiments includes two optical multiplexers/demultiplexers 101 according to the embodiments, which multiplex and demultiplex the foregoing four monochromatic lights; one being an optical multiplexer/demultiplexer 101*a* operating as the optical multiplexer, and the other being an optical multiplexer/demultiplexer 101*b* operating as the optical demultiplexer. A casing 102 of the optical transceiver 100 according to the embodiments houses the optical multiplexer/demultiplexer 101*a* and the optical multiplexer/demultiplexer 101*b*, and also houses four light emitting means 121 to 124 and four light receiving means 151 to 154. The light emitting means 121 to 124 each include, for example, a laser diode (LD) and a driving circuit for the LD. The light receiving means 151 to 154 each include, for example, a photodiode (PD) and an amplifier circuit for a signal optically-transformed by the PD. The optical transceiver 100 according to the embodiment are connected to four data transmission paths 111 to 114 for sending and to four data transmission paths 161 to 164 for receiving; the data transmission paths 111 to 114 input data in the form of electrical signals, and the data transmission paths 161 to 164 output the data in the form of electrical signals. Furthermore, the optical transceiver 100 is connected to an optical transmission path 130 for sending and to an optical transmission path 140 for receiving; both optical transmission paths 130 and 140 are constituted of the optical fibers. The optical transmission path 130 outputs the optical signal multiplexed by the WDM method to the optical communications network N. The optical transmission path 140 inputs the multiplexed optical signal from the optical communications network N to the optical multiplexer/demultiplexer 101*b* in the optical transceiver 100.

Next, the following describes the sending operation and the receiving operation by the optical transceiver 100 according to the embodiments. Assuming that a side of the optical communications network is defined as upstream, a direction in which the signal is sent is defined as upstream, and a direction in which the signal is received is defined as the downstream. The sending operation first inputs the electrical signals to the four light emitting means 121 to 124 via the four data transmission paths 111 to 114 for sending, the electrical signals corresponding to the data sending to the four paths from a device such as a server which is installed downstream. The light emitting means 121 to 124 each transform the input electrical signals into the optical signals, and emit the optical signals. The four light emitting means 121 to 124 emit the monochromatic lights having the wavelengths $\lambda_1$ to $\lambda_4$ different from one another. In this example, the demultiplexing collimators C1 to C4 and the multiplexing collimator C5 are the optical fiber collimators. The lights respectively emitted from the light emitting means 121 to 124 are input through the optical fiber to the four demultiplexing collimators C1 to C4 of the optical multiplexer/demultiplexer 101*a* operating as the optical multiplexer. Thus, the optical signals composed of the monochromatic lights having the four different wavelengths $\lambda_1$ to $\lambda_4$ are input to the optical multiplexer/demultiplexer 101*a*. The optical multiplexer/demultiplexer 101*a* operating as the optical multiplexer multiplexes the input lights having the four wavelengths $\lambda_1$ to $\lambda_4$, and outputs from the multiplexing collimator C5 the optical signal composed of the multiplexed light. The optical signal composed of the multiplexed light including the lights having the four wavelengths $\lambda_1$ to $\lambda_4$ is delivered to the optical communications network N via the optical transmission path 130.

On the other hand, in the receiving operation, the optical signal composed of the multiplexed light including the lights having the four wavelengths $\lambda_1$ to $\lambda_4$ is input via the optical transmission path 140 from the optical communications network N to the multiplexing collimator C5 of the optical multiplexer/demultiplexer 101b operating as the optical demultiplexer. The optical multiplexer/demultiplexer 101b demultiplexes the input multiplexed light to the monochromatic lights having the four wavelengths $\lambda_1$ to $\lambda_4$. Then, the optical signals composed of the monochromatic lights respectively having the different wavelengths $\lambda_1$ to $\lambda_4$ are emitted from the demultiplexing collimators C1 to C4. The optical signals respectively emitted from the demultiplexing collimators C1 to C4 are individually input to the four light receiving means 151 to 154. The light receiving means 151 to 154 each transform the received optical signal into the electrical signals and output the electrical signals. The electrical signals which have been output respectively from the light receiving means 151 to 154 are input, via the four data transmission paths 161 to 164 for reception, to the server located downstream and then are provided for data processing.

The above-described embodiments are illustrative and do not limit this disclosure. Thus, numerous additional modifications and variations are possible in light of the above teachings. For example, elements or features of different illustrative embodiments herein may be combined with or substituted for each other within the scope of this disclosure and the appended claims. Further, features of components of the embodiments, such as number, position, and shape, are not limited to those of the disclosed embodiments and thus may be set as preferred. It is therefore to be understood that, within the scope of the appended claims, this disclosure may be practiced otherwise than as specifically described herein.

What is claimed is:

1. An optical multiplexer/demultiplexer where n is defined as a natural number of 3 or more and where k is defined as a natural number from 2 to n−1, comprising:
   first to n-th demultiplexed light input/output portions, disposed to input/output along a first direction respectively n kinds of first to n-th monochromatic lights having different wavelengths,
   the first to n-th demultiplexed light input/output portions separated from one another in a direction intersecting with the first direction;
   a multiplexed light input/output portion to input/output along the first direction a multiplexed light produced by multiplexing the n kinds of monochromatic lights;
   first to n−1-th mirrors to reflect respectively the first to n−1-th monochromatic lights,
   the first to n−1-th monochromatic lights respectively striking the first to n−1-th mirrors from the first to n−1-th demultiplexed light input/output portions;
   interference film filters disposed respectively on optical paths between the second to n−1-th demultiplexed light input/output portions and the second to n−1-th mirrors,
   interference film filters configured to selectively transmit the second to n−1-th monochromatic lights respectively to reflect a light with another wavelength; and
   an n-th interference film filter disposed on an optical path between the n-th demultiplexed light input/output portion and the multiplexed light input/output portion,
   the n-th interference film filter configured to selectively transmit the n-th monochromatic light to reflect a light with another wavelength,
   wherein:
   the first mirror is disposed such that the first mirror reflects a light between the first demultiplexed light input/output portion and the second interference film filter,
   the k-th mirror is disposed such that the k-th mirror reflects a light between the k-th interference film filter and the k+1-th interference film filter,
   the k-th interference film filter is disposed such that the k-th interference film filter reflects between the k−1-th mirror and the k-th mirror a light other than the k-th monochromatic light, and
   the n-th interference film filter is disposed such that the n-th interference film filter reflects between the n−1-th mirror and the multiplexed light input/output portion a light other than the n-th monochromatic light.

2. The optical multiplexer/demultiplexer according to claim 1, further comprising:
   a first interference film filter disposed on an optical path between the first demultiplexed light input/output portion and the first mirror, and
   the first interference film filter is configured to selectively transmit the first monochromatic light to reflect a light with another wavelength.

3. The optical multiplexer/demultiplexer according to claim 1, wherein
   the first to n-th demultiplexed light input/output portions are disposed at apexes of a polygon on a plane intersecting with the first direction, and
   the first to n-th demultiplexed light input/output portions are arranged in an ascending order around the polygon.

4. The optical multiplexer/demultiplexer according to claim 1, wherein
   the first to n-th demultiplexed light input/output portions are disposed in multiple stages such that the first to n-th demultiplexed light input/output portions form a plurality of parallel lines arranged along a y-axis direction configured to intersect with an x-axis direction as a line direction on a plane,
   the x-axis direction configured on the plane intersecting with the first direction,
   the first demultiplexed light input/output portion is disposed on a first line, and
   the second to n-th demultiplexed light input/output portions are arranged in an ascending order starting from the first demultiplexed light input/output portion while inverting direction at predetermined intervals.

5. The optical multiplexer/demultiplexer according to claim 1, wherein:
   the second to n-th demultiplexed light input/output portions are disposed respectively at positions at which lights that transit the corresponding second to n-th interference film filters are emitted, and
   the multiplexed light input/output portion is disposed on an optical path of the light that transits the n-th interference film filter.

6. The optical multiplexer/demultiplexer according to claim 1, wherein
   the first to n−1-th mirrors and/or the second to n-th interference film filters have reflecting back surfaces, and
   the back surfaces are opposite to front surfaces for light entering.

7. The optical multiplexer/demultiplexer according to claim 1, wherein
   the optical multiplexer/demultiplexer further comprises an optical path deflecting portion, and the optical path deflecting portion bends an optical path between the n-th interference film filter and the multiplexed light input/output portion such that the multiplexed light input/output portion is disposed inside a region where the first to n-th demultiplexed light input/output portions are disposed.

8. The optical multiplexer/demultiplexer according to claim 1, wherein the first to n-th demultiplexed light input/output portions and the multiplexed light input/output portion are each tubular collimators, the optical multiplexer/demultiplexer further comprises a collimator holder for fixing the collimators in place using an adhesive, when an axis direction of the tubular collimators is defined as a front-rear direction, the collimator holder has a front end surface and a rear end surface that are perpendicular to the front-rear direction, the collimator holder includes:

a guide part extending in the front-rear direction and having an open end on both the front end surface and the rear end surface, the guide part having a cross section matching a cross section of each of the collimators; and an opening communicating between an inner surface of the guide part and outside.

9. An optical transceiver comprising:

a casing;

an optical multiplexer housed in the casing; and an optical demultiplexer housed in the casing, wherein at least one of the optical multiplexer and the optical demultiplexer is the optical multiplexer/demultiplexer according to claim 1.

10. The optical multiplexer/demultiplexer according to claim 4, wherein, where n is defined as an even number of 4 or more, the first to n/2-th demultiplexed light input/output portions are disposed on the first line of the plurality of lines, the n/2+1-th to n-th demultiplexed light input/output portions are disposed on a second line of the plurality of lines, a substrate is disposed between the first line and the second line, two surfaces of the substrate face in the y-axis direction, the second to n/2-th interference film filters and the first to n/2-th mirrors are fixed to the one of the two surfaces of the substrate, and the n/2+1-th to n-th interference film filters and the n/2+1-th to n−1-th mirrors are fixed to the other of the two surfaces of the substrate.

11. The optical multiplexer/demultiplexer according to claim 7, wherein the optical path deflecting portion bends light such that entering light turns back in an inverse direction to be emitted.

12. The optical multiplexer/demultiplexer according to claim 8, wherein:

the guide part is a guide hole penetrating both the front end surface and the rear end surface, and the opening is a communication hole branched from a middle of the guide hole to outside.

13. The optical multiplexer/demultiplexer according to claim 8, wherein the guide part is a guide groove extending in the front-rear direction, and the opening is a slit extending in the front-rear direction and having a width equal to a width of the guide groove.

14. The optical multiplexer/demultiplexer according to claim 8, wherein the guide part is a guide hole penetrating both the front end surface and the rear end surface, and the opening is a slit extending in the front-rear direction and having a width narrower than a diameter of the guide hole.

15. The optical multiplexer/demultiplexer according to claim 8, wherein the guide part is a guide hole penetrating both the front end surface and the rear end surface, and the opening is a groove that divides the guide hole at the cross-sectional surface into a front part and a rear part.

16. The optical multiplexer/demultiplexer according to claim 8, wherein the guide part and the opening are formed at a member having a front end surface and a rear end surface.

17. The optical multiplexer/demultiplexer according to claim 10, wherein, where m is defined as a natural number from 2 to n, a z-axis direction is the first direction, an m−1-th mirror and an m-th interference film filter are disposed on an identical surface parallel to a z-x plane, the m−1-th mirror and the m-th interference film filter are fixed on an identical auxiliary substrate placed on the substrate, and the auxiliary substrate is capable of rotating around a y-axis and fixed at a predetermined rotation position.

18. The optical multiplexer/demultiplexer according to claim 12, wherein the communication hole is formed extending linearly radially outward from inner surfaces of the guide hole, and the communication hole communicates to the outside.

19. The optical multiplexer/demultiplexer according to claim 17, wherein:

the substrate includes a fixing plate having a surface parallel to a y-z plane, and the m−1-th mirror and the m-th interference film filter are disposed to form a plurality of parallel lines, and the m−1-th mirror and the m-th interference film filter have side surfaces parallel to the y-z plane and fixed to the fixing plate.

* * * * *